US007284258B2

(12) United States Patent
Mineyama

(10) Patent No.: US 7,284,258 B2
(45) Date of Patent: Oct. 16, 2007

(54) APPARATUS AND SYSTEM FOR PROVIDING PROGRAM-RELATED INFORMATION, AND PROGRAM-RELATED INFORMATION PROVIDING METHOD

(75) Inventor: Toru Mineyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1491 days.

(21) Appl. No.: 09/944,848

(22) Filed: Aug. 31, 2001

(65) Prior Publication Data

US 2002/0048449 A1 Apr. 25, 2002

(30) Foreign Application Priority Data

Sep. 1, 2000 (JP) .............................. 2000-266139

(51) Int. Cl.
G06F 3/00 (2006.01)
G06F 13/00 (2006.01)
H04N 5/445 (2006.01)

(52) U.S. Cl. .............................. 725/58; 725/50; 725/55; 725/91; 725/114; 725/115; 386/46; 386/83

(58) Field of Classification Search .................. 725/55, 725/114–118, 121, 133, 134, 136, 141, 142, 725/91–94, 109, 112–113, 39–40, 50, 58, 725/86; 386/46, 83; 709/217–219; 348/460

See application file for complete search history.

(56) References Cited

U.S. PATENT DOCUMENTS 5,530,469 A 6/1996 Garfinkle

| 5,629,733 | A | | 5/1997 | Youman et al. |
|---|---|---|---|---|
| 5,774,666 | A | * | 6/1998 | Portuesi ....................... 725/110 |
| 2002/0046407 | A1 | * | 4/2002 | Franco ......................... 725/110 |
| 2005/0229213 | A1 | * | 10/2005 | Ellis et al. ..................... 725/58 |

FOREIGN PATENT DOCUMENTS

| EP | 0 854 645 | 7/1998 |
|---|---|---|
| WO | WO98 06219 | 2/1998 |

* cited by examiner

*Primary Examiner*—Ngoc Vu
(74) *Attorney, Agent, or Firm*—Finnegan, Henderson, Farabow, Garrett & Dunner, L.L.P.

(57) ABSTRACT

A simple program-related information providing apparatus provides information related to a program to be broadcast to a user while the user is watching the program. The program-related information providing apparatus includes a first program-reserve-record setting script generator for generating a first program-reserve-record setting script, which serves as a control command for recording a program in a program table in a recording medium. A program-related information address display script generator generates a program-related information address display script including address information which indicates the network address of the program-related information and from which the program-related information is accessible, and also including display time information specifying the display time of the address information. A second program-reserve-record setting script generator generates a second program-reserve-record setting script by attaching the program-related information address display script to the first program-reserve-record setting script. A transmitter transmits the second program-reserve-record setting script to a terminal device.

52 Claims, 23 Drawing Sheets

FIG. 2

```
         ┌ Content_type:application/x-tv-program-info:charset=shift_jis
         │ version:1
         │ station:xxbroadcast
         │ year:2000
         │ month:10
         │ day:10
         │ start:08:30
         │ end:09:00
         │ program-title:ABC drama series
   20a   └ Mr. A   Ms. B   Mr. C ┌ <body>
         │ <wait time00:00:01:00>
         │ <group>
         │ <start00:00:01:00  length00:00:01:00>http//www.OX.or.jp/pr/bangumi/asadra/asadra1.htm
         │ <start00:00:01:00  length00:00:01:00>http//www.OX.or.jp/pr/bangumi/asadra/asadra2.htm
         │ </group>
         │ <start00:00:02:00  length00:00:10:00>http//www.OX.or.jp/pr/bangumi/asadra/asadra3.htm
         │ <start00:00:12:00  length00:00:05:00>http//www.OX.or.jp/pr/bangumi/asadra/asadra4.htm
         │ <start00:00:17:00  length00:00:05:00>http//www.OX.or.jp/pr/bangumi/asadra/asadra5.htm
   20b   │ <start00:00:22:00  length00:00:05:00>http//www.OX.or.jp/pr/bangumi/asadra/asadra6.htm
         └ </body>
```

FIG. 9

| | 8 p.m. | | 9 p.m. | 10 p.m. | |
|---|---|---|---|---|---|
| AAA BROADCAST CH1 | 0 | PROFESSIONAL WRESTLING (RESERVE) | 0 | LA2 NEXT WEEK (RESERVE) | |
| BBB BROADCAST CH2 | SPECIAL (RESERVE) | 30 | MOVIE THEATER (RESERVE) | 0 | |
| CCC BROADCAST CH3 | MUSIC (RESERVE) | 0 | GREAT NATURE (RESERVE) | BOWLING (RESERVE) | 30 CUTE ANGEL KENT (RESERVE) |
| DDD TV CH4 | QUIZZES (RESERVE) | 0 | THEATER (RESERVE) | 0 | |
| EEE TV CH5 | NEWS (RESERVE) | 30 | WORLD CUP FOOTBALL (RESERVE) | FRENCH MOVIE UNTIL 12 a.m. (RESERVE) | |
| FFF BROADCAST CH6 | FISHING (RESERVE) | 30 NEWS & SPORTS (RESERVE) | ADVENTURE (RESERVE) | OVERSEAS TRAVEL INFORMATION (RESERVE) | |
| GGG TV CH7 | MOVIE THEATER (RESERVE) | | | HOW TO USE DIGITAL VIDEO (RESERVE) | 30 NEWS (RESERVE) |
| HHH TV CH8 | COUNT DOWN (RESERVE) | 30 | CAR PURCHASE INFORMATION (RESERVE) | 22DRAMA (RESERVE) | |
| JJJ TV CH9 | NEWS/ STOCK MARKET (RESERVE) | SCIENCE (RESERVE) | THEATER (RESERVE) | YESTERDAY (RESERVE) | |
| KKK BROADCAST CH10 | CHALLENGE (RESERVE) | 0 | SWORD (RESERVE) | 30 2/4 (RESERVE) | NY (RESERVE) |

FIG. 11

```
FILE(F)  EDIT(E)  VIEW(V)  JUMP(G)  COMMUNICATOR(C)  HELP(H)
⇐         ⇒        ↻        ⌂         🔍        □     □      □        □
BACKWARD FORWARD RE-READ HOME SEARCH GUIDE PRINT SECURITY STOP
BOOKMARK      SITE: [                              ▽] ○RELATED SITE
```

DEVICES AVAILABLE FOR RESERVE-RECORDING USE ARE AS FOLLOWS.

| DEVICE ID | DEVICE TYPE | MANUFAC-TURER | MODEL | DEFAULT |
|---|---|---|---|---|
| 1 | DV | ○△□× | S△D-D01 | ◎ |
| 2 | VTR | ○△□× | D◎R-1000 | |
| 3 | DVD | ○△□× | D□P-F11 | |

REGISTER AS DEFAULT DEVICE?

[YES]  [NO]

APPARATUS AND SYSTEM FOR PROVIDING PROGRAM-RELATED INFORMATION, AND PROGRAM-RELATED INFORMATION PROVIDING METHOD

BACKGROUND OF THE INVENTION

1. Field of the Invention

The present invention relates to an apparatus and system for providing program-related information to viewers while the viewers are watching the program. The invention also relates to a program-related information providing method for use in the above-described apparatus or system.

2. Description of the Related Art

Hitherto, there is provided a method for providing information related to a television broadcast program, for example, information concerning props, such as the clothes and articles worn by actors, and the filming location in a drama program, player statistics in a sport program, recipes in a cooking program, and the destination in a travel program, to program viewers in real time while they are watching the program.

In the above-described program-related information providing method, the vertical blanking periods of television signals may be used.

Television signals include vertical blanking periods, which are not displayed by regular television signal receivers, and the program-related information may be inserted into the vertical blanking periods. That is, the program-related information can be multiplexed with television signals. The program and the multiplexed program-related information can be provided to users by transmitting such television signals.

However, the bandwidth of the vertical blanking periods of the television signals is limited, and the amount of program-related information which can be inserted into the program is accordingly restricted. Therefore, the versatility of the program-related information which can be provided to the users is seriously hampered.

Since the program-related information is multiplexed with television signals, it is inevitable that the amount of information is increased, and the time for transmitting the information accordingly becomes longer.

Additionally, in order to provide the program-related information in a predetermined scene to program viewers while they are watching the program, it is necessary to cache the program-related information in a receiver in advance. This makes the configuration of the receiver complicated.

SUMMARY OF THE INVENTION

Accordingly, in order to solve the above-described problems, it is an object of the present invention to provide a simple apparatus and system for providing program-related information to program viewers while they are watching the program by using a simple technique and without decreasing the amount of program-related information, and also to provide a program-related information providing method for use in the above-described apparatus or system.

In order to achieve the above object, according to one aspect of the present invention, there is provided a program-related information providing apparatus which includes a storage unit for storing program information, which serves as attribute information of a program, and a program table, and which sends the program information and the program table to a terminal device via a network in response to a request from the terminal device. The program-related information providing apparatus includes a search unit for searching for the program information stored in the storage unit in response to a program-reserve-record setting request for a program in the program table from the terminal device. A first program-reserve-record setting script generator generates a first program-reserve-record setting script, which serves as a control command for recording the program in the program table on a recording medium, based on the program information searched by the search unit. A program-related information address display script generator generates a program-related information address display script including address information which indicates an address on the network of program-related information of the program in the program table and from which the program-related information is accessible, and also including display time information specifying a display time of the address information, the program-related information address display script serving as a control command for displaying the address information on the terminal device. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the terminal device.

According to another aspect of the present invention, there is provided a program-related information providing method for use in a program-related information providing apparatus which includes a storage unit for storing program information, which serves as attribute information of a program, and a program table, and which sends the program information and the program table to a terminal device via a network in response to a request from the terminal device. The program-related information providing method includes the steps of: searching for the program information stored in the storage unit in response to a program-reserve-record setting request for a program in the program table from the terminal device; generating a first program-reserve-record setting script, which serves as a control command for recording the program in the program table on a recording medium, based on the searched program information; generating a program-related information address display script including address information which indicates an address on the network of program-related information of the program in the program table and from which the program-related information is accessible, and also including display time information specifying a display time of the address information, the program-related information address display script serving as a control command for displaying the address information on the terminal device; generating a second program-reserve-record setting script by attaching the program-related information address display script to the first program-reserve-record setting script; and transmitting the second program-reserve-record setting script to the terminal device.

According to still another aspect of the present invention, there is provided a program-related information providing apparatus which includes a storage unit for storing program information, which serves as attribute information of a program, and a program table, and which sends the program information and the program table to a first terminal device via a network in response to a request from the first terminal device. The program-related information providing apparatus includes a search unit for searching for the program information stored in the storage unit in response to a program-reserve-record setting request for a program in the program table from the first terminal device. A first program-reserve-record setting script generator generates a first program-reserve-record setting script, which serves as a control command for recording the program in the program table on a recording medium, based on the program information searched by the search unit. A program-related information address display script generator generates a program-related information address display script including address information which indicates an address on the network of program-related information of the program in the program table and from which the program-related information is accessible, and also including display time information specifying a display time of the address information, the program-related information address display script serving as a control command for displaying the address information on a second terminal device. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the second terminal device.

According to a further aspect of the present invention, there is provided a program-related information providing method for use in a program-related information providing apparatus which includes a storage unit for storing program information, which serves as attribute information of a program, and a program table, and which sends the program information and the program table to a first terminal device via a network in response to a request from the first terminal device. The program-related information providing method includes the steps of: searching for the program information stored in the storage unit in response to a program-reserve-record setting request for a program in the program table from the first terminal device; generating a first program-reserve-record setting script, which serves as a control command for recording the program in the program table on a recording medium, based on the searched program information; generating a program-related information address display script including address information which indicates an address on the network of program-related information of the program in the program table and from which the program-related information is accessible, and also including display time information specifying a display time of the address information, the program-related information address display script serving as a control command for displaying the address information on a second terminal device; generating a second program-reserve-record setting script by attaching the program-related information address display script to the first program-reserve-record setting script; and transmitting the second program-reserve-record setting script to the second terminal device.

With this arrangement, it is possible to provide program-related information of a program recorded on a recording medium to a user while the user is watching the program according to a simple apparatus and method and without decreasing the amount of information.

According to a yet further aspect of the present invention, there is provided a program-related information providing system including a program-related information providing apparatus and a terminal device connected to each other via a network. The program-related information providing apparatus includes a storage unit for storing program information, which serves as attribute information of a program, and a program table. The program-related information providing apparatus sends the program information and the program table to the terminal device in response to a request from the terminal device. The terminal device makes a reserve-record setting request for a program in the program table sent from the program-related information providing apparatus. The terminal device includes a recording unit for recording the requested program on a recording medium and a playback unit for playing back the program recorded on the recording medium. The program-related information providing apparatus includes a search unit for searching for the program information stored in the storage unit in response to the program-reserve-record setting request sent from the terminal device. A first program-reserve-record setting script generator generates a first program-reserve-record setting script, which serves as a control command for recording the program in the program table on the recording medium, based on the program information searched by the search unit. A program-related information address display script generator generates a program-related information address display script, which serves as a control command to the terminal device, including address information which indicates an address on the network of program-related information of the program in the program table, and also including display time information specifying a display time of the address information. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the terminal device. The terminal device includes a first receiver for receiving the second program-reserve-record setting script transmitted from the transmitter of the program-related information providing apparatus. A detector detects the first program-reserve-record-setting script from the second program-reserve-record setting script received by the first receiver. A second receiver receives at a predetermined time the program specified by the first program-reserve-record setting script detected by the detector. A signal converter converts the first program-reserve-record setting script detected by the detector into a program-reserve-record setting control signal. A control unit controls the recording unit according to the program-reserve-record setting control signal converted by the signal converter to record on the recording medium the program received by the second receiver and the program-related information address display script of the program attached to the second program-reserve-record setting script received by the first receiver. A display unit displays the program played back by the playback unit. The control unit of the terminal device controls the playback unit to play back the program recorded on the recording medium in response to a playback request, and reads the address information and the display time information from the program-related information address display script recorded on the recording medium so as to control the display unit to display or not to display the read address information based on the display time information.

According to a further aspect of the present invention, there is provided a program-related information providing method for use in a program-related information providing system which includes a program-related information providing apparatus and a terminal device connected to each other via a network. The program-related information providing apparatus includes a storage unit for storing program information, which serves as attribute information of a program, and a program table. The program-related information providing apparatus sends the program information and the program table to the terminal device in response to a request from the terminal device. The terminal device makes a reserve-record setting request for a program in the program table sent from the program-related information providing apparatus. The terminal device includes a recording unit for recording the requested program on a recording medium and a playback unit for playing back the program recorded on the recording medium. The program-related information providing method includes the steps of: searching for the program information stored in the storage unit by the program-related information providing apparatus in response to the program-reserve-record setting request sent from the terminal device; generating by the program-related information providing apparatus a first program-reserve-record setting script, which serves as a control command for instructing the recording unit to record the program in the program table on the recording medium, based on the searched program information; generating by the program-related information providing apparatus a program-related information address display script, which serves as a control command to the terminal device, including address information indicating an address on the network of program-related information of the program in the program table, and also including display time information specifying a display time of the address information; generating a second program-reserve-record setting script by the program-related information providing apparatus by attaching the program-related information address display script to the first program-reserve-record setting script; transmitting the second program-reserve-record setting script from the program-related information providing apparatus to the terminal device; receiving by the terminal device the second program-reserve-record setting script transmitted from the program-related information providing apparatus; detecting by the terminal device the first program-reserve-record-setting script from the received second program-reserve-record setting script; receiving at a predetermined time by the terminal device the program specified by the detected first program-reserve-record setting script; converting the detected first program-reserve-record setting script into a program-reserve-record setting control signal by the terminal device; controlling the recording unit by the terminal device according to the converted program-reserve-record setting control signal to record on the recording medium the received program and the program-related information address display script of the program attached to the second program-reserve-record setting script; and controlling by the terminal device the playback unit to play back the program recorded on the recording medium in response to a playback request, and reading the address information and the display time information from the program-related information address display script recorded on the recording medium so as to control a display unit of the terminal device to display or not to display the read address information based on the display time information.

According to a further aspect of the present invention, there is provided a program-related information providing system including a program-related information providing apparatus, a first terminal device, and a second terminal device connected to each other via a network. The program-related information providing apparatus includes a storage unit for storing program information, which serves as attribute information of a program, and a program table. The program-related information providing apparatus sends the program information and the program table to the first terminal device in response to a request from the first terminal device. The first terminal device makes a reserve-record setting request for a program in the program table sent from the program-related information providing apparatus. The second terminal device includes a recording unit for recording the requested program on a recording medium and a playback unit for playing back the program recorded on the recording medium. The program-related information providing apparatus includes a search unit for searching for the program information stored in the storage unit in response to the program-reserve-record setting request sent from the first terminal device. A first program-reserve-record setting script generator generates a first program-reserve-record setting script, which serves as a control command for recording the program in the program table on the recording medium based on the program information searched by the search unit. A program-related information address display script generator generates a program-related information address display script, which serves as a control command to the second terminal, including address information which indicates an address on the network of program-related information of the program in the program table, and also including display time information specifying a display time of the address information. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the second terminal device. The second terminal device includes a first receiver for receiving the second program-reserve-record setting script transmitted from the transmitter of the program-related information providing apparatus. A detector detects the first program-reserve-record-setting script from the second program-reserve-record setting script received by the first receiver. A second receiver receives at a predetermined time the program specified by the first program-reserve-record setting script detected by the detector. A signal converter converts the first program-reserve-record setting script detected by the detector into a program-reserve-record setting control signal. A control unit controls the recording unit according to the program-reserve-record setting control signal converted by the signal converter to record on the recording medium the program received by the second receiver and the program-related information address display script of the program attached to the second program-reserve-record setting script received by the first receiver. A display unit displays the program played back by the playback unit. The control unit of the second terminal device controls the playback unit to play back the program recorded on the recording medium in response to a playback request, and controls the display unit to display or not to display the address information included in the program-related information address display script recorded on the recording medium based on the display time information.

According to a further aspect of the present invention, there is provided a program-related information providing method for use in a program-related information providing system which includes a program-related information providing apparatus, a first terminal device, and a second terminal device connected to each other via a network. The program-related information providing apparatus includes a storage unit for storing program information, which serves as attribute information of a program, and a program table. The program-related information providing apparatus sends the program information and the program table to the first terminal device in response to a request from the first terminal device. The first terminal device makes a reserve-record setting request for a program in the program table sent from the program-related information providing apparatus. The second terminal device includes a recording unit for recording the requested program on a recording medium and a playback unit for playing back the program recorded on the recording medium. The program-related information providing method includes the steps of: searching for the program information stored in the storage unit by the program-related information providing apparatus in response to the program-reserve-record setting request sent from the first terminal device; generating by the program-related information providing apparatus a first program-reserve-record setting script, which serves as a control command for recording the program in the program table on the recording medium based on the searched program information; generating by the program-related information providing apparatus a program-related information address display script, which serves as a control command to the second terminal device, including address information indicating an address on the network of program-related information of the program in the program table, and also including display time information specifying a display time of the address information; generating a second program-reserve-record setting script by the program-related information providing apparatus by attaching the program-related information address display script to the first program-reserve-record setting script; transmitting the second program-reserve-record setting script from the program-related information providing apparatus to the second terminal device; receiving by the second terminal device the second program-reserve-record setting script transmitted from the program-related information providing apparatus; detecting by the second terminal device the first program-reserve-record setting script from the received second program-reserve-record setting script; receiving at a predetermined time by the second terminal device the program specified by the detected first program-reserve-record setting script; converting the detected first program-reserve-record setting script into a program-reserve-record setting control signal by the second terminal device; controlling the recording unit by the second terminal device according to the converted program-reserve-record setting control signal to record on the recording medium the received program and the program-related information address display script of the program attached to the received second program-reserve-record setting script; and controlling by the second terminal device the playback unit to play back the program recorded on the recording medium in response to a playback request, and controlling display unit of the second terminal device to display or not to display the address information included in the program-related information address display script recorded on the recording medium based on the display time information.

According to a further aspect of the present invention, there is provided a program-related information providing system including a program-related information providing apparatus, a terminal device, and a recording/playback device connected to each other via a network. The program-related information providing apparatus includes a storage unit for storing program information, which serves as attribute information of a program, and a program table. The program-related information providing apparatus sends the program information and the program table to the terminal device in response to a request from the terminal device. The terminal device makes a reserve-record setting request for a program in the program table sent from the program-related information providing apparatus. The recording/playback device includes a recording unit for recording the requested program on a recording medium and a playback unit for playing back the program recorded on the recording medium. The program-related information providing apparatus includes a search unit for searching for the program information stored in the storage unit in response to the program-reserve-record setting request sent from the terminal device. A first program-reserve-record setting script generator generates a first program-reserve-record setting script, which serves as a control command for instructing the recording/playback device to record the program in the program table on the recording medium based on the program information searched by the search unit. A program-related information address display script generator generates a program-related information address display script, which serves as a control command to the terminal device, including address information indicating an address on the network of program-related information of the program in the program table, and also including display time information specifying a display time of the address information. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the terminal device. The terminal device includes a first receiver for receiving the second program-reserve-record setting script transmitted from the transmitter of the program-related information providing apparatus. A detector detects the first program-reserve-record-setting script from the second program-reserve-record setting script received by the first receiver. A second receiver receives at a predetermined time the program specified by the first program-reserve-record setting script detected by the detector. A signal converter converts the first program-reserve-record setting script detected by the detector into a program-reserve-record setting control signal. A control unit controls the recording unit of the recording/playback device according to the program-reserve-record setting control signal converted by the signal converter to record on the recording medium the program received by the second receiver and the program-related information address display script of the program attached to the second program-reserve-record setting script received by the first receiver. A display unit displays the program played back by the playback unit. The control unit of the terminal device controls the playback unit of the recording/playback device to play back the program recorded on the recording medium in response to a playback request, and also reads the address information and the display time information from the program-related-information address display script recorded on the recording medium so as to control the display unit to display or not to display the read address information based on the display time information.

According to a further aspect of the present invention, there is provided a program-related information providing method for use in a program-related information providing system which includes a program-related information providing apparatus, a terminal device, and a recording/playback device connected to each other via a network. The program-related information providing apparatus includes a storage unit for storing program information, which serves as attribute information of a program, and a program table. The program-related information providing apparatus sends the program information and the program table to the terminal device in response to a request from the terminal device. The terminal device makes a reserve-record setting request for a program in the program table sent from the program-related information providing apparatus. The recording/playback device includes a recording unit for recording the requested program on a recording medium and a playback unit for playing back the program recorded on the recording medium. The program-related information providing method includes the steps of: searching for the program information stored in the storage unit by the program-related information providing apparatus in response to the program-reserve-record setting request sent from the terminal device; generating by the program-related information providing apparatus a first program-reserve-record setting script, which serves as a control command for recording the program in the program table on the recording medium, based on the searched program information; generating by the program-related information providing apparatus a program-related information address display script, which serves as a control command to the terminal device, including address information indicating an address on the network of program-related information of the program in the program table, and also including display time information specifying a display time of the address information; generating a second program-reserve-record setting script by the program-related information providing apparatus by attaching the program-related information address display script to the first program-reserve-record setting script; transmitting the second program-reserve-record setting script from the program-related information providing apparatus to the terminal device; receiving by the terminal device the second program-reserve-record setting script transmitted from the program-related information providing apparatus; detecting by the terminal device the first program-reserve-record-setting script from the received second program-reserve-record setting script; receiving at a predetermined time by the terminal device the program specified by the detected first program-reserve-record setting script; converting the detected first program-reserve-record setting script into a program-reserve-record setting control signal by the terminal device; controlling the recording unit by the terminal device according to the converted program-reserve-record setting control signal to record on the recording medium the received program and the program-related information address display script of the program attached to the received second program-reserve-record setting script; and controlling by the terminal device the playback unit of the recording/playback device to play back the program recorded on the recording medium in response to a playback request, and also reading the address information and the display time information from the program-related-information address display script recorded on the recording medium so as to control display unit of the terminal device to display or not to display the read address information based on the display time information.

According to a further aspect of the present invention, there is provided a program-related information providing system including a program-related information providing apparatus, a first terminal device, a second terminal device, and a recording/playback device connected to each other via a network. The program-related information providing apparatus includes a storage unit for storing program information, which serves as attribute information of a program, and a program table. The program-related information providing apparatus sends the program information and the program table to the first terminal device in response to a request from the first terminal device. The second terminal device makes a reserve-record setting request for a program in the program table sent from the program-related information providing apparatus. The recording/playback device includes a recording unit for recording the requested program on a recording medium and a playback unit for playing back the program recorded on the recording medium. The program-related information providing apparatus includes a search unit for searching for the program information stored in the storage unit in response to the program-reserve-record setting request sent from the second terminal device. A first program-reserve-record setting script generator generates a first program-reserve-record setting script, which serves as a control command for instructing the recording/playback device to record the program in the program table on the recording medium, based on the program information searched by the search unit. A program-related information address display script generator generates a program-related information address display script, which serves as a control command to the second terminal device, including address information indicating an address on the network of program-related information of the program in the program table, and also including display time information specifying a display time of the address information. A second program-reserve-record setting script generator generates a second program-reserve-record setting script by attaching the program-related information address display script to the first program-reserve-record setting script. A transmitter transmits the second program-reserve-record setting script generated by the second program-reserve-record setting script generator to the second terminal device. The second terminal device includes a first receiver for receiving the second program-reserve-record setting script transmitted from the transmitter of the program-related information providing apparatus. A detector detects the first program-reserve-record-setting script from the second program-reserve-record setting script received by the first receiver. a second receiver receives at a predetermined time the program specified by the first program-reserve-record setting script detected by the detector. A signal converter converts the first program-reserve-record setting script detected by the detector into a program-reserve-record setting control signal. A control unit controls the recording unit of the recording/playback device according to the program-reserve-record setting control signal converted by the signal converter to record on the recording medium the program received by the second receiver and the program-related information address display script of the program attached to the second program-reserve-record setting script received by the first receiver. A display unit displays the program played back by the playback unit. The control unit of the second terminal device controls the playback unit of the recording/playback device to play back the program recorded on the recording medium in response to a playback request, and also reads the address information and the display time information from the program-related-information address display script recorded on the recording medium so as to control the display unit of the second terminal device to display or not to display the read address information based on the display time information.

According to a further aspect of the present invention, there is provided a program-related information providing method for use in a program-related information providing system which includes a program-related information providing apparatus, a first terminal device, a second terminal device, and a recording/playback device connected to each other via a network. The program-related information providing apparatus includes a storage unit for storing program information, which serves as attribute information of a program, and a program table. The program-related information providing apparatus sends the program information and the program table to the first terminal device in response to a request from the first terminal device. The second terminal device makes a reserve-record setting request for a program in the program table sent from the program-related information providing apparatus. The recording/playback device includes a recording unit for recording the requested program on a recording medium and a playback unit for playing back the program recorded on the recording medium. The program-related information providing method includes the steps of: searching for the program information stored in the storage unit by the program-related information providing apparatus in response to the program-reserve-record setting request sent from the second terminal device; generating by the program-related information providing apparatus a first program-reserve-record setting script, which serves as a control command for recording the program in the program table on the recording medium based on the searched program information; generating by the program-related information providing apparatus a program-related information address display script, which serves as a control command to the second terminal device, including address information indicating an address on the network of program-related information of the program in the program table, and also including display time information specifying a display time of the address information; generating a second program-reserve-record setting script by the program-related information providing apparatus by attaching the program-related information address display script to the first program-reserve-record setting script; transmitting the second program-reserve-record setting script from the program-related information providing apparatus to the second terminal device; receiving by the second terminal device the second program-reserve-record setting script transmitted from the program-related information providing apparatus; detecting by the second terminal device the first program-reserve-record-setting script from the received second program-reserve-record setting script; receiving at a predetermined time by the second terminal device the program specified by the detected first program-reserve-record setting script; converting the detected first program-reserve-record setting script into a program-reserve-record setting control signal by the second terminal device; controlling the recording unit of the recording/playback device by the second terminal device according to the converted program-reserve-record setting control signal to record on the recording medium the received program and the program-related information address display script of the program attached to the received second program-reserve-record setting script; and controlling by the second terminal device the playback unit of the recording/playback device to play back the program recorded on the recording medium in response to a playback request, and also reading the address information and the display time information from the program-related-information address display script recorded on the recording medium so as to control display unit of the second terminal device to display or not to display the read address information based on the display time information.

With this arrangement, it is possible to provide program-related information of a program recorded on a recording medium to a user while the user is watching the program according to a simple system and method and without decreasing the amount of information.

According to a further aspect of the present invention, there is provided a program-related information providing apparatus which includes a storage unit for storing program information, which serves as attribute information of a program, and a program table, and which sends the program information and the program table to a terminal device via a network in response to a request from the terminal device. The program-related information providing apparatus includes a reception permission unit for permitting the terminal device to receive a program in the program table in response to a program viewing request sent from the terminal device. A search unit searches for the program information stored in the storage unit at the same time the reception permission unit permits the terminal device to receive the program. A program-related information address display script generator generates a program-related information address display script including address information which indicates an address on the network of program-related information of the program in the program table and from which the program-related information is accessible, and also including display time information specifying a display time of the address information. The program-related information address display script serves as a control command for displaying the address information on the terminal device. A script transmitter transmits the program-related information address display script generated by the program-related information address display script generator to the terminal device.

According to a further aspect of the present invention, there is provided a program-related information providing method for use in a program-related information providing apparatus which includes a storage unit for storing program information, which serves as attribute information of a program, and a program table, and which sends the program information and the program table to a terminal device via a network in response to a request from the terminal device. The program-related information providing method includes the steps of: permitting the terminal device to receive the program in a program table in response to a program viewing request sent from the terminal device; searching for the program information stored in the storage unit at the same time the terminal device is permitted to receive the program; generating a program-related information address display script including address information which indicates an address on the network of program-related information of the program in the program table and from which the program-related information is accessible, and also including display time information specifying a display time of the address information. The program-related information address display script serves as a control command for displaying the address information on the terminal device; and transmitting the generated program-related information address display script to the terminal device.

With this arrangement, it is possible to provide program-related information of a program to be broadcast in real time to a user while the user is watching the program according to a simple apparatus and method and without decreasing the amount of information.

According to a further aspect of the present invention, there is provided a program-related information providing system including a program-related information providing apparatus and a terminal device connected to each other via a network. The program-related information providing apparatus includes a storage unit for storing program information, which serves as attribute information of a program, and a program table. The program-related information providing apparatus sends the program information and the program table to the terminal device via a network in response to a request from the terminal device. The terminal device makes a program viewing request of a program in the program table sent from the program-related information providing apparatus. The program-related information providing apparatus includes a reception permission unit for permitting the terminal device to receive the program in the program table in response to the program viewing request sent from the terminal device. A search unit searches for the program information stored in the storage unit at the same time the reception permission unit permits the terminal device to receive the program. A program-related information address display script generator generates a program-related information address display script including address information which indicates an address on the network of program-related information of the program in the program table and from which the program-related information is accessible, and also including display time information specifying a display time of the address information. The program-related information address display script serves as a control command for displaying the address information on the terminal device. A script transmitter transmits the program-related information address display script generated by the program-related information address display script generator to the terminal device. The terminal device includes a first receiver for receiving the program permitted to be received by the reception permission unit of the program-related information providing apparatus. A display unit displays the program received by the first receiver. a second receiver receives the program-related information address display script transmitted from the script transmitter. A detector detects the address information and the display time information from the program-related information address display script received by the second receiver. A control unit controls the display unit to display or not to display the address information based on the display time information detected by the detector.

According to a further aspect of the present invention, there is provided a program-related information providing method for use in a program-related information providing system which includes a program-related information providing apparatus and a terminal device connected to each other via a network. The program-related information providing apparatus includes a storage unit for storing program information, which serves as attribute information of a program, and a program table. The program-related information providing apparatus sends the program information and the program table to the terminal device via a network in response to a request from the terminal device. The terminal device makes a program viewing request of a program in the program table sent from the program-related information providing apparatus. The program-related information providing method includes the steps of: permitting by the program-related information providing apparatus the terminal device to receive the program in the program table in response to the program viewing request sent from the terminal device; receiving by the terminal device the program permitted to be received by the program-related information providing apparatus; displaying the received program on a display unit of the terminal device; searching for the program information stored in the storage unit by the program-related information providing apparatus at the same time the terminal device is permitted to receive the program; generating by the program-related information providing apparatus a program-related information address display script including address information which indicates an address on the network of program-related information of the program in the program table and from which the program-related information is accessible, and also including display time information specifying a display time of the address information, the program-related information address display script serving as a control command for displaying the address information on the terminal device; transmitting the generated program-related information address display script from the program-related information providing apparatus to the terminal device; receiving by the terminal device the program-related information address display script transmitted from the program-related information providing apparatus; detecting the address information and the display time information from the received program-related information address display script by the terminal device; and controlling the display unit of the terminal device to display or not to display the address information based on the detected display time information.

With this arrangement, it is possible to provide program-related information of a program to be broadcast in real time to a user while the user is watching the program according to a simple system and method and without decreasing the amount of information.

According to a further aspect of the present invention, there is provided a program-information providing method for providing program information of a television program displayed on a computer terminal. The program-information providing method includes: a step of generating the program information which includes a broadcast time of the television program and which is used when recording the television program; a step of preparing program-related information of the television program; a step of generating a URL address of the program-related information on a network and an address display time at which the URL address is displayed on the computer terminal; and a step of transmitting the program information, the URL address, and the address display time to the computer terminal by relating them to each other so that the URL address is displayed on the computer terminal at a time corresponding to the address display time when the television program recorded on the computer terminal at a time specified by a user is played back on the computer terminal in response to a user's request.

According to a further aspect of the present invention, there is provided a program-information providing method for providing program information of a television program displayed on a computer terminal. The program-information providing method includes: a step of generating the program information which includes a broadcast time of the television program and which is used when recording the television program; a step of preparing program-related information of the television program; a step of generating a URL address of the program-related information on a network and an address display time at which the URL address is displayed on the computer terminal; and a step of transmitting the program information, the URL address, and the address display time by relating them to each other so that the program-related information is accessible by a user via a network at a time corresponding to the content of the television program and at a time specified by the address display time while the television program is being played back on the computer terminal.

BRIEF DESCRIPTION OF THE DRAWINGS

FIG. 2 illustrates an example of a program-reserve-record setting script sent from a program-related information providing apparatus in the program-related information providing system shown in FIG. 1;

FIG. 9 illustrates an example of a program table provided to a portable terminal device via a web browser in the program-related information providing system shown in FIG. 6;

FIG. 11 illustrates an example of a recording-device selection screen provided to a portable terminal device via a web browser in the program-related information providing system shown in FIG. 6;

DESCRIPTION OF PREFERRED EMBODIMENTS

The present invention is described in detail below with reference to the accompanying drawings through illustration of a preferred embodiment.

Figure 1:
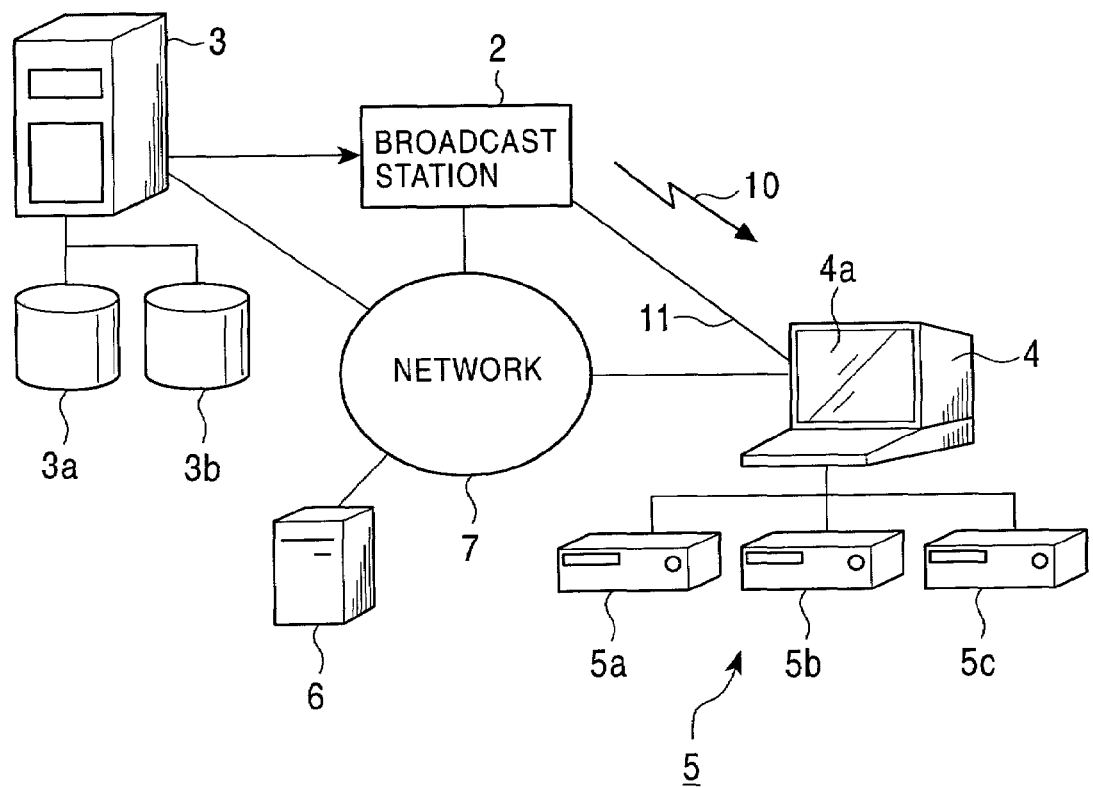
FIG. 1 is a schematic view illustrating the configuration of a program-related information providing system according to an embodiment of the present invention.

FIG. 1 illustrates a program-related information providing system 1 according to an embodiment of the present invention.

In the program-related information providing system 1, a broadcast station 2, a program-related information providing apparatus 3, a terminal device 4, and a plurality of program related-information information servers 6 are connected to each other via a network 7.

The broadcast station 2 transmits a predetermined program to the terminal device 4 via television radio waves 10 having a predetermined frequency band. Alternatively, the broadcast station 2 may be connected to the terminal device 4 via a special cable 11, in which case, the broadcast station 2 transmits the predetermined program to the terminal device 4 via the cable 11. The broadcast station 2 may be connected to the network 7, in which case, it transmits the predetermined program to the terminal device 4 via the network 7.

The program-related information apparatus 3 is connected to the network 7, and includes two databases. One database 3a stores program information, i.e., attribute information of programs broadcast by the broadcast station 2, for example, synopses of the individual programs, and a program table containing all the programs of each channel. The other database 3b stores program-reserve-record setting scripts, which will be discussed below, in each user's account.

A storage unit (not shown) of the program-related information providing apparatus 3 stores a web server program for providing the program information and the program table stored in the database 3a on the Internet to the user, and the user is able to view such information and the table via a web browser provided for the terminal device 4.

The program-related information providing apparatus 3 also generates a program-reserve-record setting script in response to a user's request, and transmits it to the terminal device 4 via the network 7. The program-reserve-record setting script is a control command, based on the program information, for controlling a recorder or a recording unit 5 of the terminal device 4 to automatically record a program to be broadcast by the broadcast station 2 on a recording medium at a predetermined time (hereinafter referred to as a "reserve-record mode").

Even when the user watches the program in real time with the terminal device 4 (hereinafter referred to as a "on-air mode"), the program-reserve-record setting script is also generated for linking the program with the program-related information, and is transmitted to the terminal device 4 via the network 7. The script generated in the on-air mode is referred to as a "program-related information script".

The terminal device 4 may be a personal computer (PC), and it integrates a tuner for receiving terrestrial waves, a broadcasting satellite (BS) tuner, and a communications satellite (CS) tuner. Each tuner receives a carrier modulated wave of a predetermined frequency as a program, and demodulates it into the program consisting of a video signal and an audio signal. Alternatively, the terminal device 4 may be connected to the broadcast station 2 via the special cable 11, in which case, the terminal device 4 receives a predetermined program transmitted from the broadcast station 2 via the cable 11. The terminal device 4 may be connected to the broadcast station 2 via the network 7, in which case, it receives a program sent from the broadcast station 2.

The terminal device 4 has a recording medium or a recorder for recording programs in an attached recording medium. The recording medium may be a magnetic tape, a magnetic disk, a magneto-optical disk, or an optical disc. The terminal device 4 receives a program-reserve-record setting script sent from the program-related information providing apparatus 3. A control unit provided for the terminal device 4 converts the received program-reserve-record setting script into a reserve-record control signal which is suitable for the recorder, and controls the recorder to record the program on the recording medium according to the converted reserve-record control signal. Before sending the program-reserve-record setting script to the recording unit 5 specified by the program-reserve-record setting script, the terminal device 4 converts it to a control signal which is suitable for the recording unit 5, and then sends the control signal to the recording unit 5. For example, the terminal device 4 converts the program-reserve-record setting script to an infrared (IR) control signal, a local area network (LAN) control signal, an iLINK (registered) control signal.

The terminal device 4 includes a playback unit for playing back the program recorded on the recording medium, and displays the program on a display unit 4a provided for the terminal device 4 by using a program display browser. The user is then able to watch the recorded program at the desired time. The terminal device 4 is also able to directly display the program transmitted from the broadcast station 2 by using the program display browser.

The terminal device 4 also stores a URL display browser and a program-related information display browser in a storage unit (not shown). The URL display browser is used for displaying a program-related information URL indicating the network address of the program-related information corresponding to the program displayed by using the program display browser. The program-related information display browser is used for searching the network 7 for the program-related information at the address indicated by the program-related information URL when the URL is accessed, and for displaying the program-related information on the display unit 4a. As discussed in detail below, the program-related information URL is displayed by using the URL display browser at a suitable time while the user is watching the program according to the program-reserve-record setting script sent from the program-related information providing apparatus 3.

Program-reserve-record setting script pickup software for picking up program-reserve-record setting scripts stored in the database 3b of the program-related information apparatus 3 is stored in the storage unit of the terminal device 4 according to the account of the terminal device 4. The program-reserve-record setting script pickup software is run by establishing a session between the terminal device 4 and the program-related information providing apparatus 3 so as to search for the program-reserve-record setting script stored in the user's account of the database 3b. The program-reserve-record setting script is then downloaded.

The terminal device 4 may be a mobile PC, for example, a portable information terminal device, such as a personal digital assistant (PDA), provided with a function of connecting to the network 7 and a program receiving function.

The recording unit 5 integrates a tuner for receiving terrestrial waves, a BS tuner and a CS tuner. Each tuner receives a carrier modulated wave of a predetermined frequency as a program, and demodulates the carrier wave to the program consisting of a video signal and an audio signal. The recording unit 5 has a recording medium or a recorder for recording the program on an attached recording medium. The recording medium may be a magnetic tape, a magnetic disk, a magneto-optical disk, or an optical disc. The recording unit 5 receives a reserve-record control signal based on the program-reserve-record setting script sent from the terminal device 4. Upon receiving the reserve-record control signal, the recording unit 5 records the program on the recording medium according to the reserve-record control signal. The recording unit S may include, as shown in FIG. 1, a plurality of recording devices, such as a digital video (DV) 5a, a video cassette recorder (VCR) 5b, and a digital video disk (DVD) 5c.

A plurality of program-related information providing servers 6 are disposed on the network 7, and each server 6 stores a plurality of items of program-related information of the programs transmitted from the broadcast station 2. The program-related information providing server 6 provides the program-related information corresponding to the URL displayed by using the URL display browser in response to a request from the terminal device 4.

The program-related information may include the following items. If the program sent from the broadcast station 2 is a drama, information on props, such as clothes and watches worn by actors, or the filming location may be provided. If the program is a travel program, information which cannot be introduced in the program or additional information, such as the names of inns and hotels introduced in the program, traveling itineraries, contact numbers of the travel agency may be provided. If the program is a cooking program, recipes introduced in the program may be provided. However, the program-related information is not restricted to the above-described examples, and may be any information related to the programs.

The network 7 connects the broadcast station 2, the program-related information providing apparatus 3, the terminal device 4, and the program-related information servers 6 with each other, and information can be transmitted and received to and from these elements.

A description is now given of, with reference to FIG. 2, the program-reserve-record setting script generated by the program-related information providing apparatus 3 when it is in the reserve-record mode.

The program-reserve-record setting script includes a program information description area 20*a* in which information of a program to be reserve-recorded is described, and a URL list description area 20*b* in which information for linking a URL list indicating the addresses of the program-related information to the programs is described.

In the program information description area 20*a*, there are provided items, such as "station" indicating the broadcast station 2 broadcasting the program, "year", "month", and "day" indicating the year, month, and day at which the program is broadcast, "start" representing the time at which the program starts, "end" representing the time at which the program ends, and "program-title" indicating the title of the program. For example, if the broadcast station 2 broadcasting the program is an "XX broadcast", "station:XX broadcast" is indicated. If the broadcast date is "Oct. 10, 2000", "year:2000", "month:10", and "day:10" are shown. If the broadcast start time and the broadcast end time are "8:30 a.m.", "9:00 a.m.", respectively, "start:08:30" and "end:09:00" are indicated. If the tile of the program is "ABC drama series", "program-title:ABC drama series" is shown.

Additionally, the leading actors and actresses in the program, such as a "Mr. A", "Ms. B", and "Mr. C", may be shown after the "program-title".

As indicated by the URL list description area 20*b*, the program-reserve-record setting script also contains a predetermined URL list for enabling the terminal device 4 to obtain the program-related information via the network 7.

The URL indicating the addresses of the program-related information on the network 7 is displayed on the display unit 4*a* of the terminal device 4 via the URL display browser according to the URL list in an appropriate portion (at an appropriate time) of the program while the user is watching the program. The URL list is defined by predetermined tags attached to the program-reserve-record setting script shown in FIG. 2.

Details of the URL list description area 20*b* are as follows.

The tag "<body>" indicates the start of the definition of the URL list description area 20*b*. The tag "<body>" forms a pair with the tag "</body>". The tag "</body>" indicates the end of the definition of the URL list description area 20*b*.

The tag "<wait time>" defines the wait time until the first URL list is displayed on the URL display window. For example, the tag "<wait time 00:00:01:00>" indicates that the first URL is displayed one minute after the start of the program.

The tag "<group>" forms a pair with the tag "</group>", and groups the URLs to be displayed on the URL display window at the same time. The tag "<group>" indicates the start of the grouping, and the tag "</group>" indicates the end of the grouping.

The tag "<start~length~>" defines each item of the program-related information. Immediately after this tag, the URL indicating the address of the program-related information is described. After the tag "<start>", the relative display start time of the program-related information on the URL display window after the start of the program is shown. After the tag "<length>", the period for displaying the URL designating the address of the program-related information on the URL window is indicated. For example, the tag "<start~length~>" is expressed by "<start 00:00:01:00 length 00:00:01:00>http://www.xx.or.jp/pr/bangumi/asadra/asadra1.ht m". The URL designated by this tag indicates that the program-related information is displayed for one minute by using the URL display browser starting one minute after the beginning of the program.

If there is a plurality of URLs displayed by using the URL display browser at the same time, they can be displayed by using the above-described tags "<group>" and "</group>".
<group>
<start 00:00:01:00
length 00:00:01:00>http://www.xx.or.jp/pr/bangumi/asadra/asadra1.htm
<start 00:00:01:00
length 00:00:01:00>http://www.xx.or.jp/pr/bangumi/asadra/asadra2.htm
</group>

Subsequently, the tag "<start 00:00:02:00 length 00:00:10:00>http://www.xx.or.jp/pr/bangumi/asadra/asadra3.htm" indicates that the URL "http://www.xx.or.jp/pr/bangumi/asadra/asadra3.htm" is displayed for ten minutes via the URL display browser starting two minutes after the beginning of the program. The tag "<start 00:00:12:00 length 00:00:05:00>http://www.xx.or.jp/pr/bangumi/asadra/asadra4.htm" indicates that the URL "http://www.xx.or.jp/pr/bangumi/asadra/asadra4.htm" is displayed for five minutes via the URL display browser starting 12 minutes after the beginning of the program. The tag "<start 00:00:17:00 length 00:00:05:00>http://www.xx.or.jp/pr/bangumi/asadra/asadra5.htm" indicates that the URL "http://www.xx.or.jp/pr/bangumi/asadra/asadra5.htm" is displayed for five minutes via the URL display browser starting 17 minutes after the beginning of the program. The tag "<start 00:00:22:00 length 00:00:05:00>http://www.xx.or.jp/pr/bangumi/asadra/asadra6.htm" indicates that the URL "http://www.xx.or.jp/pr/bangumi/asadra/asadra6.htm" is displayed for five minutes via the URL display browser starting 22 minutes after the beginning of the program.

By selecting the URL displayed on the display unit 4*a* of the terminal device 4, the user is able to view the related information of a desired program.

The program-related information script generated in the on-air mode is configured similarly to the above-described program-reserve-record setting script. However, in the program information description area 20*a*, only program information is indicated rather than information for reserve-recording a program.

Figure 3:
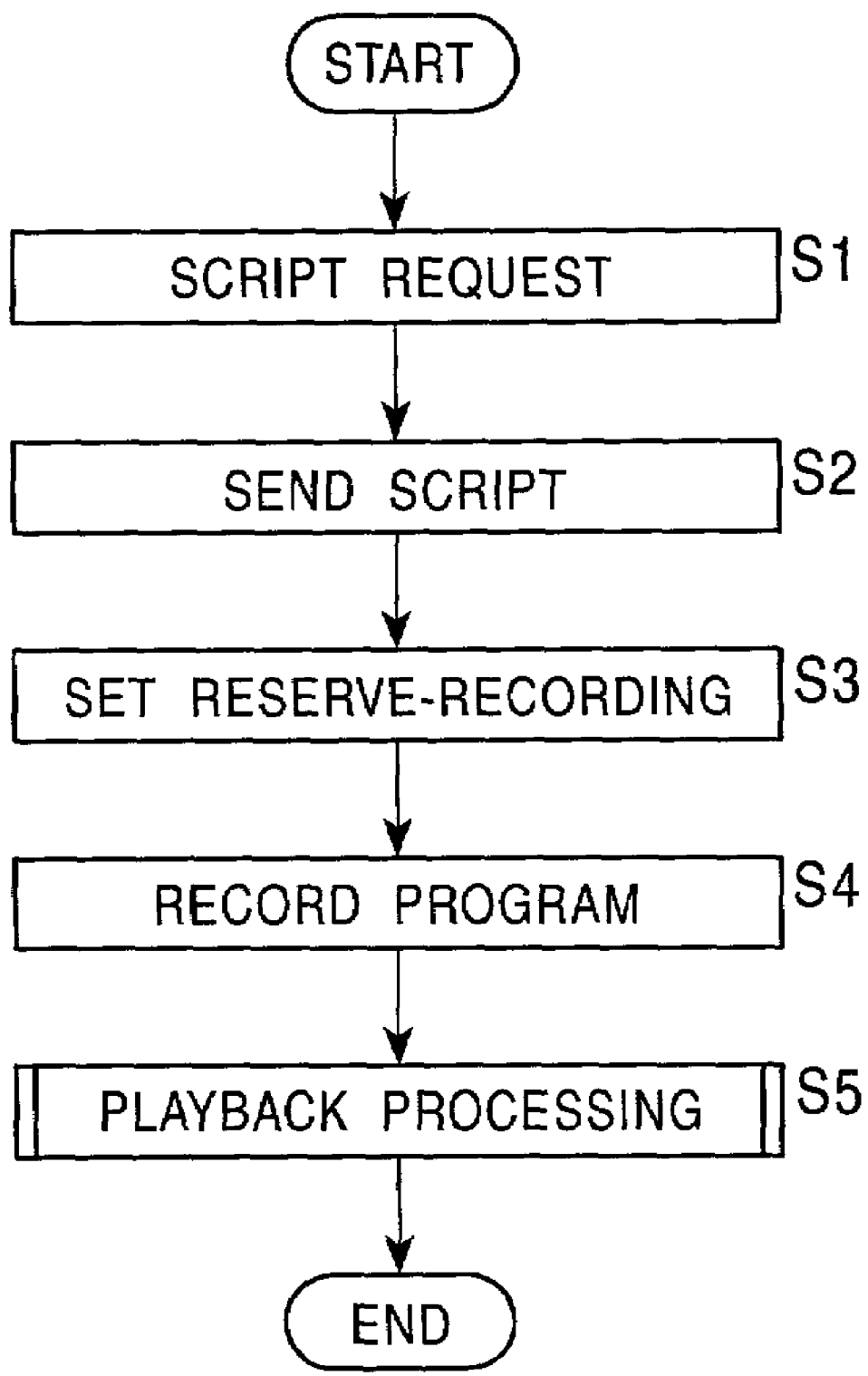
FIG. 3 is a flow chart illustrating the operation for performing program-reserve-record settings, recording the program, and playing back the recorded program.

FIG. 3 is a flow chart illustrating the operation performed by the program-related information providing system 1 in the reserve-record mode, and more specifically, the recording operation of a program on a recording medium provided for the terminal device 4 and the playback operation of the program together with the program-related information.

In step S1, the user performs settings for reserve-recording a desired program by operating an input unit (not shown) provided for the terminal device 4.

More specifically, for example, the user accesses the program-related information providing apparatus 3 via the network 7, and downloads from the database 3*a* the program table containing all the programs of the individual channels broadcast by the broadcast station 2. The user then selects a desired program to be reserve-recorded by referring to the downloaded program table, and provides an instruction to generate the above-described program-reserve-record setting script. The program-reserve-record setting script is, for example, the one shown in FIG. 2, and includes the program information description area 20*a* in which a control command for reserve-recording a program is described as a script, and the URL list description area 20*b* in which a control command providing the program-related information defined by the tags is described as a script.

A "reserve" button is provided for each program of the program table downloaded to the terminal device 4. When the user selects this "reserve" button, the corresponding information is sent to the program-related information providing apparatus 3 via the network 7. In response to this information, the program-related information providing apparatus 3 generates a program-reserve-record setting script for reserve-recording the desired program.

In step S2, according to the request from the terminal device 4, the program-related information providing apparatus 3 transmits the generated program-reserve-record setting script to the terminal device 4 via the network 7.

Then, in step S3, a control unit (not shown) of the terminal device 4 delivers the program-reserve-record setting script to reserve-record control software stored in the storage unit of the terminal device 4 according to the program-reserve-record setting script.

In step S4, the reserve-record control software sets the channel and generates a control signal for controlling a recorder (not shown) or the recording unit 5 provided for the terminal device 4 to operate at a predetermined time so that the program can be recorded on the recording medium based on the program information described in the program information description area 20a of the program-reserve-record setting script. The control unit of the terminal device 4 then controls the recorder or the recording unit 5 to record the program indicated by the program-reserve-record setting script on the recording medium according to the generated control signal.

At the same time the program is recorded on the recording medium, the control unit of the terminal device 4 stores as a URL list file the URL list description area 20b defined by the tag information attached to the program-reserve-record setting script in, for example, the same directory as that of a file in which the program is recorded.

In step S5, the user plays back the predetermined reserve-recorded program on the recording medium at a desired time. The control unit of the terminal device 4 controls a playback unit (not shown) to play back the recorded program according to the user's instruction, and then performs playback processing for displaying the program on the display unit 4a.

Figure 4:
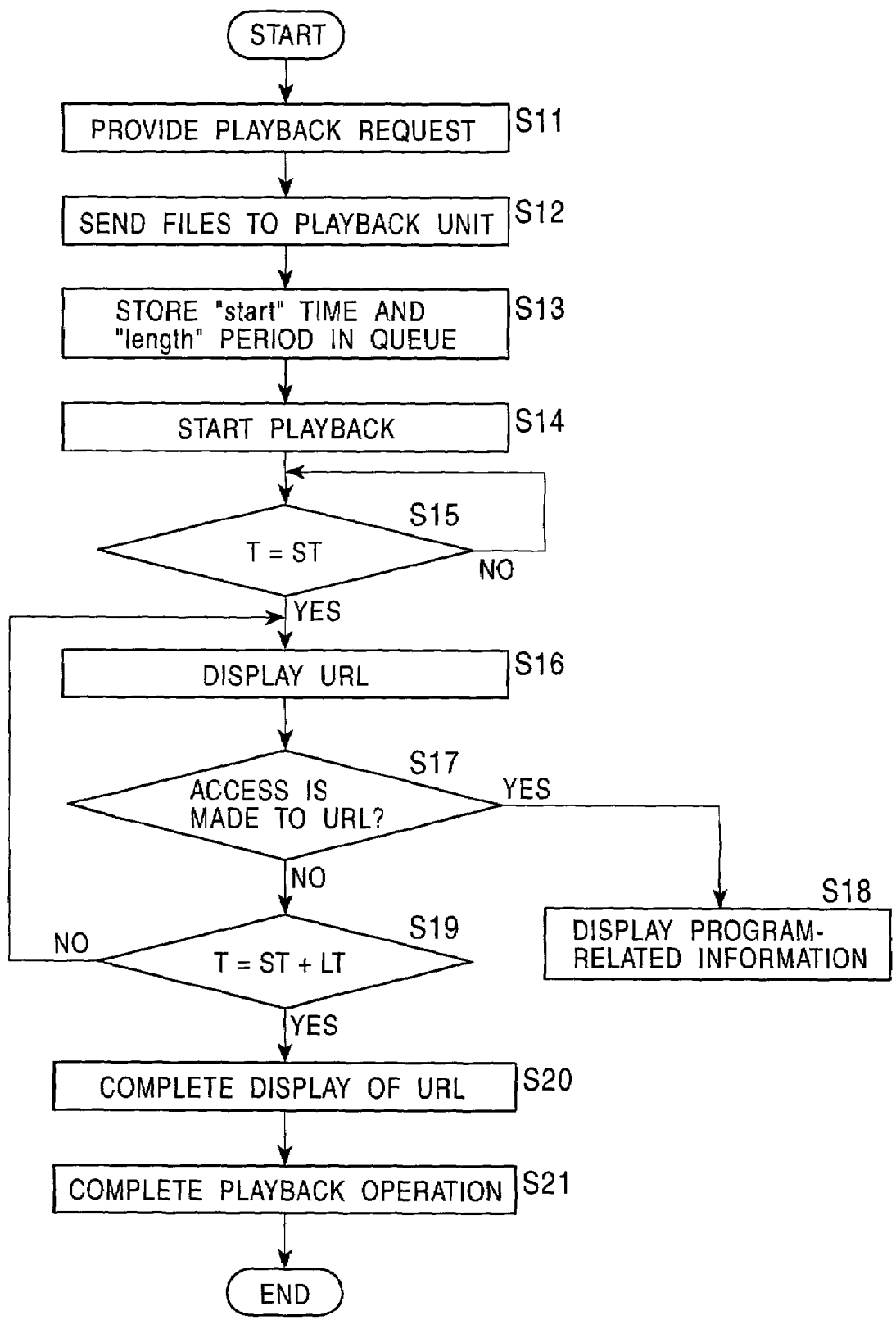
FIG. 4 is a flow chart illustrating the operation for displaying a program-related information URL in a reserve-record mode in the program-related information providing system shown in FIG. 1.

Details of the playback processing in step S5 of FIG. 3 are given below with reference to the flow chart of FIG. 4.

In step S11, the user inputs a request to play back the program recorded on the recording medium through the input unit of the terminal device 4.

Then, in step S12, in response to a request from the user, the control unit of the terminal device 4 extracts the program file and the URL list file recorded on the same directory of the recording medium, and sends them to the playback unit of the terminal device 4.

Subsequently, in step S13, the control unit starts the program display browser and the URL display browser. The control unit then sequentially stores the URLs of the URL list file, the time indicated by "start" (hereinafter referred to as "ST"), and the time indicated by "length" (hereinafter referred to as "LT") of each URL in a queue of a predetermined area of the storage unit.

In step S14, the playback unit of the terminal device 4 plays back the program file under the control of the control unit. While the playback unit is being controlled to play back the program file, the control unit of the terminal device 4 turns on a built-in timer in order to measure the program playback time T, the period for displaying the URL via the URL display browser, and the URL display end time.

Then, in step S15, the control unit of the terminal device 4 determines whether the ST of the URL stored in the queue coincides with the playback time T of the program file. If the outcome of step S15 is yes, the process proceeds to step S16. If the outcome of step S15 is no, step S15 is repeated until the playback time T coincides with the ST of the URL. The operation in step S15 continues until all the URLs stored in the queues are read.

In step S16, the control unit of the terminal device 4 delivers the URL having the URL display start time ST to the URL display browser. The URL display browser then displays the URL delivered from the control unit.

The URL displayed by the URL display browser is linked to the program-related information stored in the program-related information providing server 6 on the network 7. When the user selects the URL with, for example, a mouse, the program-related information is displayed via the program-related information display browser.

Then, in step S17, the control unit of the terminal device 4 determines whether the URL is accessed by the user. If the result of step S17 is yes, the process proceeds to step S18. If not, the process proceeds to step S19.

In step S18, in response to the user's access, the terminal device 4 downloads the program-related information indicated in the URL on the network 7, and displays it by using the program-related information browser.

Subsequently, in step S19, the control unit determines whether the sum of the URL display start time ST and the URL display time LT of the URL stored in the queue coincides with the playback time T of the program file. The sum of the display start time ST and the URL display time LT also represents the URL display end time, and if the above-described sum is equal to the playback time T of the program file, this means that the URL display period has elapsed. If the outcome of step S19 is yes, the process proceeds to step S20. If not, the process returns to step S16.

In step S20, the control unit of the terminal device 4 completes the displaying of the URL.

Then, in step S21, the control unit of the terminal device 4 completes the playback operation of the playback unit and closes the program display browser.

As described above, in the program-related information providing system 1, when playing back the program recorded on the recording medium according to the program-reserve-record setting script, the URL indicating the address of the program-related information can also be displayed according to the URL list.

Figure 5:
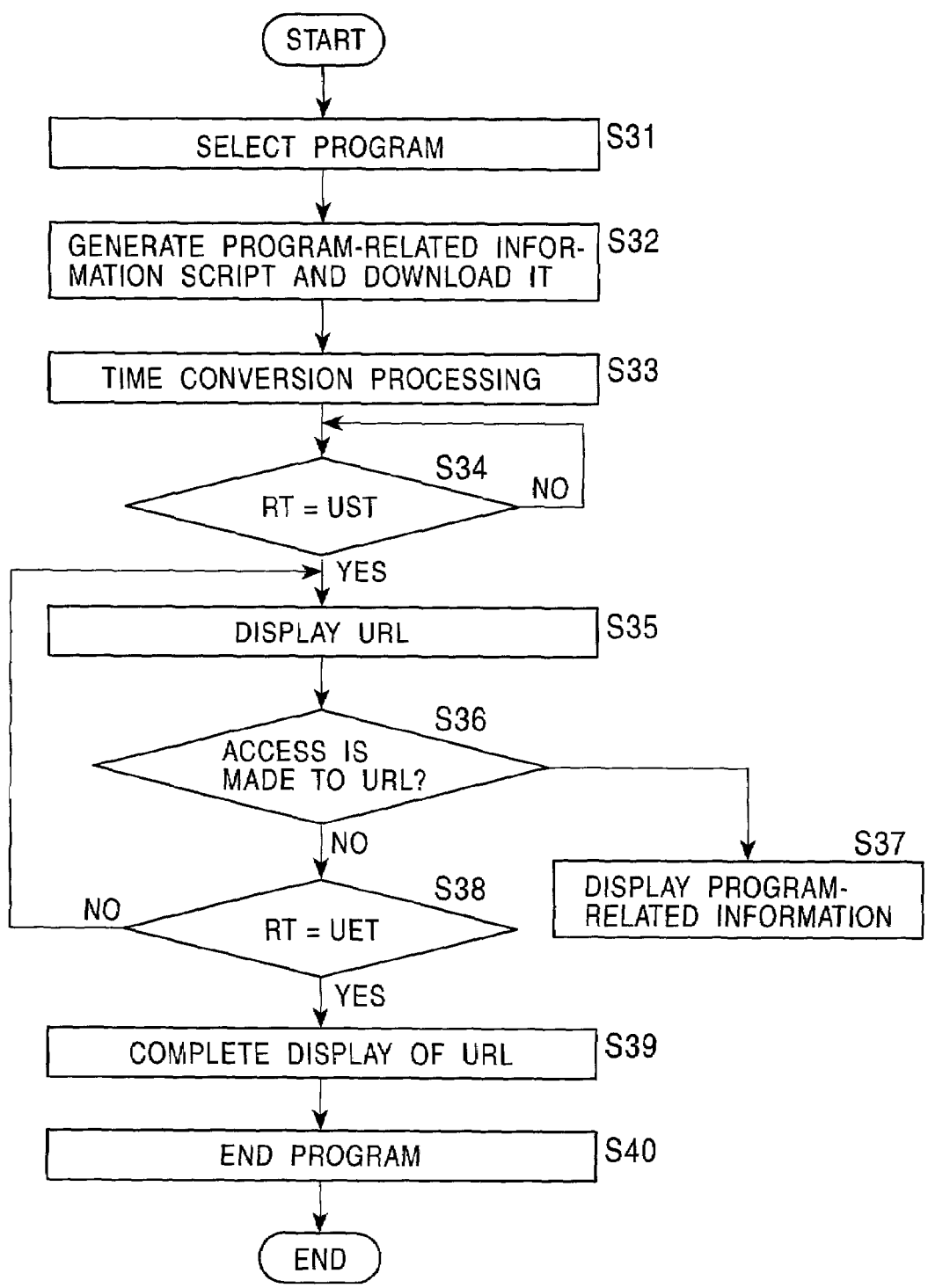
FIG. 5 is a flow chart illustrating the operation for displaying a program-related information URL in an on-air mode in the program-related information providing system shown in FIG. 1.

A description is now given, with reference to the flow chart of FIG. 5, of the display operation of the program-related information performed by the terminal device 4 when the program-related information providing system 1 is in the on-air mode.

In step S31, the user selects a desired program through the input unit of the terminal device 4.

More specifically, the user accesses the program-related information providing apparatus 3 via the network 7, and downloads the program table containing all the time-series programs of the individual channels to be broadcast by the broadcast station 2. By referring to the downloaded program table, the user selects a desired program and provides the corresponding information.

A "view" button is provided for each program of the program table downloaded to the terminal device 4. When the user selects this "view" button, the corresponding information is sent to the program-related information providing apparatus 3 via the network 7. In response to this information, the program-related information providing apparatus 3 gives the terminal device 4 a permission to receive the program corresponding to the selected "view" button. For example, if the selected program is a pay program, the program-related information providing apparatus 3 performs predetermined processing so that the terminal device 4 is able to decrypt the encrypted program.

Then, in step S32, the program-related information providing apparatus 3 generates a program-related information script in which a URL list indicating the addresses of the program-related information on the network 7 is described, and sends it to the terminal device 4 via the network 7. For example, this program-related information script is similar to that shown in FIG. 2, and includes the program information description area 20a in which the program information is described and the URL list description area 20b in which a control command providing the program-related information defined by the tags is indicated as a script.

Then, in step S33, the terminal device 4 receives the program-related information script sent from the program-related information providing apparatus 3 via the network 7. The control unit of the terminal device 4 then performs time conversion processing as follows. The control unit calculates the real time at which the displaying of the URL starts (hereinafter referred to as the "UST") by adding the URL display start time ST indicated in the URL list description area 20b to the program start time PT, and also calculates the real time at which the displaying of the URL ends (hereinafter referred to as the "UET") by adding the URL display period to the calculated UST. The time conversion processing is performed on all the URLs indicated in the script so as to determine the URL display start time UST and the URL display end time UET corresponding to the real time RT.

Thereafter, the control unit sends the URL list together with the calculated UST and UET to the playback unit of the terminal device 4, and also starts the URL display browser to display the URL on the display unit 4a. The control unit stores the URL list transmitted to the playback unit and the time-converted UST and UET in a queue of a predetermined area of the storage unit.

In step S34, the control unit extracts one of the URLs stored in the queue, and determines whether the UST of the extracted URT coincides with the real time RT. If the UST is equal to the RT, the RT indicates the time at which the URL is displayed by using the URL display browser. Thus, the process proceeds to step S35. If the UST is not equal to the RT, the process returns to step S34. The processing at step S34 is repeated until all the URLs stored in the queue are read therefrom.

In step S35, the control unit delivers the URL having the URL display start time UST to the URL display browser. The URL display browser then displays the URL.

The URL displayed by using the URL display browser is linked to the program-related information stored in the program-related information providing server 6 on the network 7. When the user selects the URL, for example, with a mouse, the program-related information is displayed via the program information display browser.

The control unit then determines in step S36 whether the URL is accessed by the user. If the outcome of step S36 is yes, the process proceeds to step S37. If not, the process proceeds to step S38.

In step S37, the terminal device 4 downloads the program-related information located at the URL on the network 7 in response to the user's access, and displays it by using the program-related information browser.

The control unit determines in step S38 whether the URL display end time UET of the URL stored in the queue coincides with the real time RT. If the result of step S38 is yes, the display period of the URL has elapsed. Then, the process proceeds to step S39. If not, the process returns to step S35.

In step S39, the control unit completes the displaying of the URL.

Then, in step S40, the control unit closes the program display browser according to the completion of the broadcast of the program transmitted from the broadcast station 2.

As discussed above, the terminal device 4 receives as a script the URL indicating the network address of the program-related information of the program transmitted from the broadcast station 2 from the program-related information providing apparatus 3, and calculates the URL display start time UST and the URL display end time UET by performing time conversion on the URL display start time and the URL display end time indicated in the script. Then, the terminal device 4 displays the URL based on the calculated time by using the URL display browser. The user is then able to view the program-related information while watching the program.

According to the present invention, the program-related information can be provided in real time as discussed with reference to the flow chart of FIG. 5. Accordingly, the present invention is applicable to a video on demand (VOD) system which enables the user to watch a program without specifying a broadcast time. In the VOD system, by selecting a desired program and executing steps S31 through S40 of FIG. 5, the user is able to obtain the URL information indicating the program-related information in real time, and to view the desired program-related information while watching the program.

Figure 6:
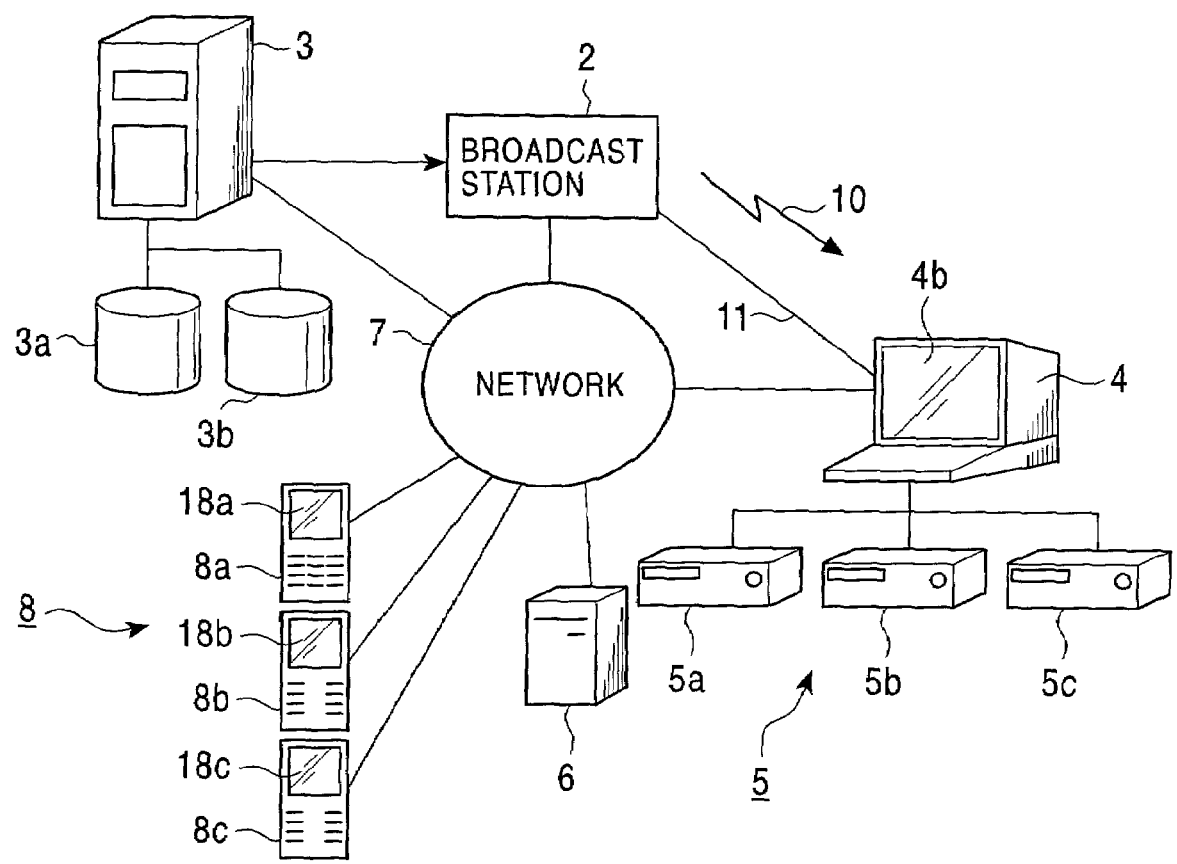
FIG. 6 is a schematic diagram illustrating the configuration of a program-related information providing system including portable terminal devices according to an embodiment of the present invention.

As described above, when the program-related information providing system 1 is in the reserve-record mode, the program-related information providing apparatus 3 generates a program-reserve-record setting script in response to an instruction from the terminal device 4, and sends it to the terminal device 4 via the network 7. However, the reserve-record settings may be made as follows. In response to an instruction from one of the portable terminal devices 8a, 8b, and 8c connected to the network 7 of the program-related information providing system 1, as shown in FIG. 6, the program-related information providing apparatus 3 may generate a program-reserve-record setting script and send it to the terminal device 4 via the network 7.

More specifically, the portable terminal devices 8a, 8b, and 8c may be cellular telephones, mobile PCs, or PDAs provided with display units 18a, 18b, and 18c, respectively, which are, for example, liquid crystal display (LCD) units, for displaying character information or image information.

The portable terminal device 8a stores in a storage unit (not shown) a web browser for obtaining program information indicating synopses of television programs provided by the program-related information providing apparatus 3 on the Internet. By using this web browser, a control unit (not shown) of the portable terminal device 8a searches the database 3a of the program-related information providing apparatus 3 for the program information on the Internet, and displays the obtained program information on the display unit 18a.

The portable terminal device 8b stores in a storage unit (not shown) mailer software (hereinafter simply referred to as a "mailer") for receiving electronic-mail (e-mail) sent from the program-related information providing apparatus 3 and for displaying the e-mail on the display unit 18b. The portable terminal device 8b may also store a web browser in the storage unit as auxiliary software of the mailer. When the user selects a URL attached to the e-mail, the web browser starts to display the corresponding program information on the display unit 18b.

The portable terminal device 8c stores in a storage unit (not shown) a mailer for receiving e-mail sent from the program-related information providing apparatus 3 and for displaying the e-mail on the display unit 18c.

According to the program-related information providing system 1 constructed as described above shown in FIG. 6, the program-related information providing apparatus 3 has the following functions.

The storage unit of the program-related information providing apparatus 3 stores a mail server program for extracting a program synopsis from program information stored in the database 3a, attaching it to e-mail, and sending the e-mail to the portable terminal devices 8b and 8c at regular intervals. The time at which the e-mail is sent to the portable terminal devices 8b and 8c may be set, for example, every three hours or at six o'clock every day by the user. A URL including information for specifying the program and the e-mail receiver, i.e., the user, for receiving a program synopsis is attached to the e-mail sent from the program-related information providing apparatus 3. This URL is linked to each item of program information stored in the database 3a of the program-related information providing apparatus 3.

A description is given below, with reference to the flow chart of FIGS. 7 and 8, of the program-reserve-record setting operation when the program-related information providing system 1 is in the direct access mode. More specifically, in the direct access mode, access is directly made from the portable terminal device 8a to the program-related information providing apparatus 3 via the Internet.

In the direct access mode, the user performs user registration before starting to use program reserve-record services provided by the program-related information providing apparatus 3. For example, information, such as the user login name, the password, the mail address, the address, the telephone numbers (of the portable terminal device 8 and the terminal device 4), the recorder or the recording unit 5 of the terminal device 4 for recording the program, and the card number required for utilizing accounting services, and user profiles, such as the name, the age, the gender, and the occupation, are registered in advance. There may be a plurality of terminal devices 4, in which case, the recorders or the recording units of such terminal devices 4 may be registered. In this case, the recorder or the recording unit 5 of the main terminal device 4 is registered as a default device.

Figure 7:
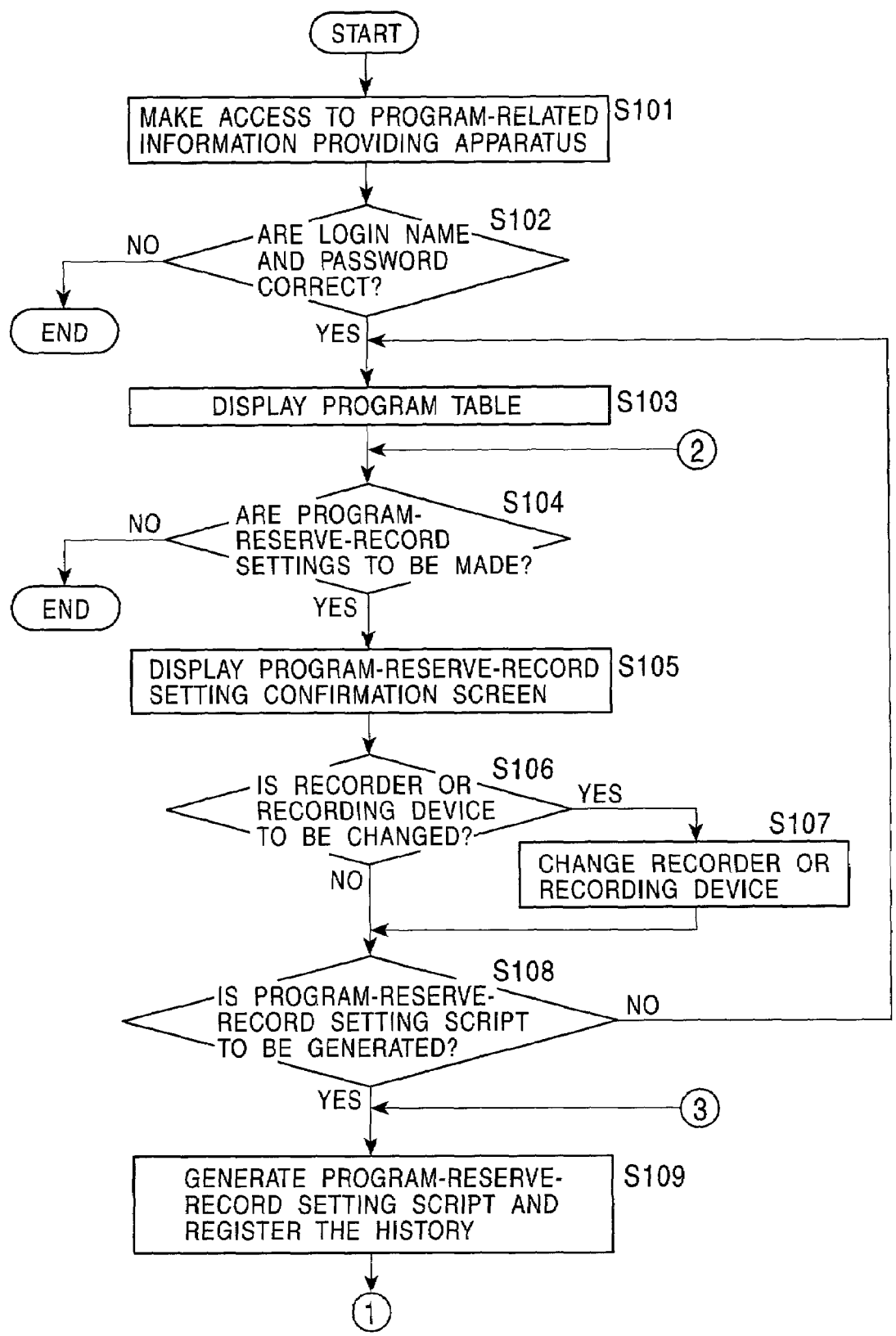
FIGS. 7 and 8 are a flow chart illustrating the operation for generating a program-reserve-record setting script in the program-related information providing system shown in FIG. 6.

In step S101 of FIG. 7, in response to a user's instruction, the control unit of the portable terminal device 8a accesses the program-related information providing apparatus 3 via the Internet by using the web browser stored in the storage unit. Accordingly, the program-related information providing apparatus 3 requests the portable terminal device 8a to input the user login name and the password via the web browser of the portable terminal device 8a.

In step S102, the program-related information providing apparatus 3 determines based on the input login name and the password whether a session for sending and receiving data is to be established between the portable terminal device 8a and the program-related information providing apparatus 3. If it is found in step S102 that the user login name and the password are valid, the process proceeds to step S103. If not, the process is terminated.

After receiving the services of the program-related information providing system 1 once by registering the user ID, the input of the login name and the password can be omitted.

Then, in step S103, the control unit of the portable terminal device 8a downloads the program table containing the program information of the programs of each channel from the database 3a by using the web browser. The portable terminal device 8a displays the downloaded program table on the display unit 18a. An example of the program table displayed on the display unit 18a is shown in FIG. 9. The program table shown in FIG. 9 contains program information of ten channels, i.e., CH1 through CH10, assigned to ten broadcast stations for three hours from 8 p.m. to 11 p.m. In a program information column, the program name, for example, "professional wrestling", by the broadcast station "AAA station" of CH1 in the time slot from 8 p.m. to 9 p.m., is provided. The "reserve" button attached to each program information column is discussed in detail below.

It is then determined in step S104 based on a user's instruction input through the portable terminal device 8a whether the program reserve-record settings for a program indicated in the program table are to be performed. If the outcome of step S104 is yes, the process proceeds to step S105, and if not, the process is ended. For example, if the user has decided to perform the program reserve-record settings by observing the program table shown in FIG. 9 displayed on the display unit 18a of the portable terminal device 8a, the user selects the "reserve" button of the desired program. Thus, the program-related information providing system 1 enters the program-reserve-record setting mode.

Then, in step S105, in response to the user's instruction given in step S104, the control unit of the portable terminal device 8a displays a confirmation screen for confirming the program-reserve-record settings by using the web browser. For example, if the user has selected the "reserve" button of the program table displayed on the display unit 18a in step S104, the control unit of the portable terminal device 8a displays the program-reserve-record setting confirmation screen for confirming the program-reserve-record settings, such as that shown in FIG. 10, on the display unit 18a by using the web browser. On the program-reserve-record setting confirmation screen shown in FIG. 10, the following items are shown: the name of the broadcast station broadcasting the program, such as "EEE TV", the broadcast date, such as "year", "month", and "day", "2000", "09", "01", respectively, the program broadcast start time "start", such as "21:00", the program broadcast end time "end", such as "22:00", the program title "programtitle", such as "world cup football", the subtitle of the program "program-subtitle", such as "Japan vs. Germany", the number for identifying the broadcast means, i.e., terrestrial waves, CS broadcast, or BS broadcast, "Infra", such as "3", and the number for identifying the recording unit 5 for recording the program, "device id", such as "1". On the program-reserve-record setting confirmation screen, a "device change" button for changing the device for recording the program, which is discussed below in step S106, and a "reserve confirmation" button for generating a program-reserve-record setting script, which is discussed below in step S108, are also provided.

It is determined in step S106 based on a user's instruction input through the portable terminal device 8a whether the recorder or the recording unit 5 set as a default device before step S101 is changed to another registered recorder or the recording unit 5. If the result of step S106 is yes, the process proceeds to step S107. If not, the process proceeds to step S108. If there is only one registered recording unit 5, steps S106 and S107 can be omitted. For example, if the "device change" button is selected on the program-reserve-record setting confirmation screen shown in FIG. 10 displayed on the display unit 18a of the portable terminal device 8a by using the web browser, a device change screen, such as that shown in FIG. 11, is displayed on the display unit 18a of the portable terminal device 8a by using the web browser. On the device change screen shown in FIG. 11, the following items are shown for each device: the "device ID" indicating the ID number of the recorder or the recording unit 5 of the terminal device 4 in the program-related information providing system 1, the "device type" designating the device type of the recorder or the recording device 5, the "manufacturer" indicating the manufacturer name of the recorder or the recording unit 5, the "model" indicating the model number of the recorder or the recording unit 5, and the "default" designating the recorder or the recording unit 5 registered as the default device. As shown in FIG. 11, three devices, a DV with the device ID 1, a VCR with the device ID 2, and a DVD with the device ID 3, are registered as the recorders or the recording units 5 of the terminal devices 4 in the program-related information providing system 1. Among these three devices, the recording unit 5 (DV) with the device ID 1 is registered as the default device.

Figure 12:
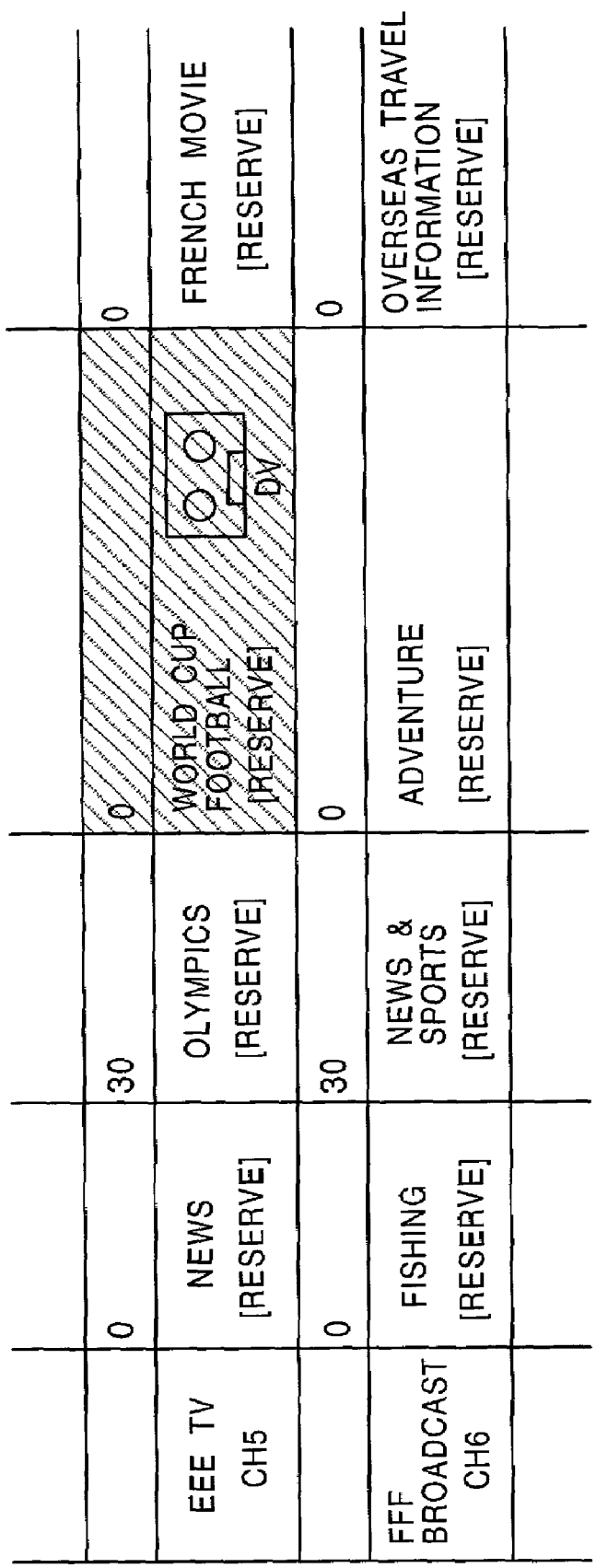
FIG. 12 illustrates an example of the program table provided to a portable terminal device via a web browser in which an icon indicating an image of a program-reserve-record set recording device is indicated in the program-related information providing system shown in FIG. 6.

In step S107, the recorder or the recording unit 5 of the terminal device 4 registered as the default device is changed in response to an instruction from the user input through the portable terminal device 8a. More specifically, the default column of the recorder or the recording unit 5 which is to be set as a new default device on the device change screen shown in FIG. 11 is checked. Then, in response to a message "Register as default device?", a "yes" button is selected. Thereafter, the web browser screen returns to the program-reserve-record setting confirmation screen shown in FIG. 10. When the recorder or the recording unit 5 for recording the program is set, an icon indicating an image of the device set as the default device is displayed, as shown in FIG. 12, in the corresponding program column of the program table. For example, an icon indicating a DV image is displayed in the program column of the "world cup football", as indicated by the hatched portion in FIG. 12.

Figure 10:
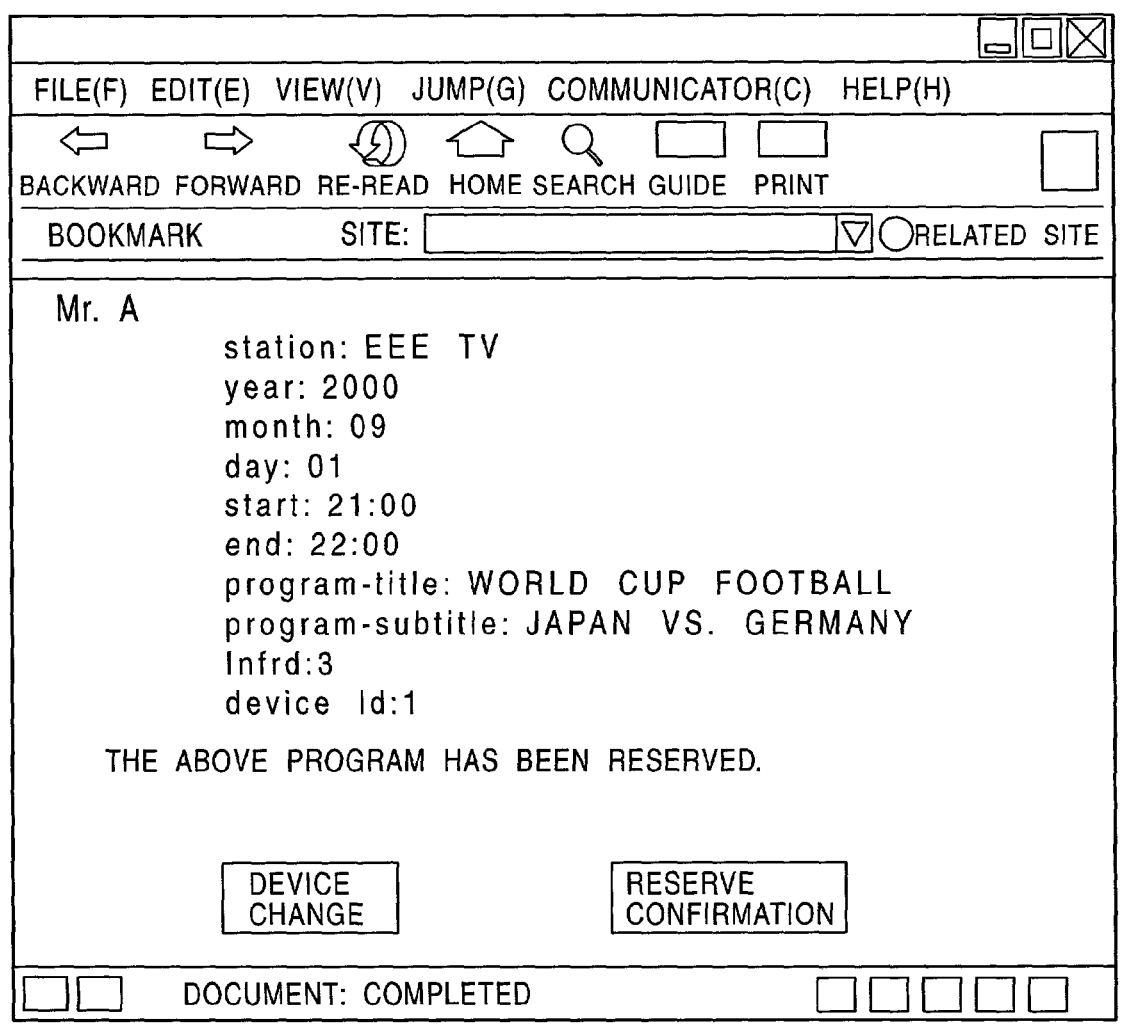
FIG. 10 illustrates an example of a program-reserve-record setting confirmation screen provided to a portable terminal device via a web browser in the program-related information providing system shown in FIG. 6.

It is then determined in step S108 based on a user's instruction input through the portable terminal device 8a whether the program-reserve-record setting script is to be generated. If the result of step S108 is yes, the process proceeds to step S109. If not, the process returns to step S103. For example, if it is desired by the user that the program-reserve-record setting script is to be generated, the "reserve confirmation" button on the program-reserve-record setting confirmation screen shown in FIG. 10 is selected, and then, the corresponding information is transmitted to the control unit of the program-related information providing apparatus 3.

In step S109, the control unit of the program-related information providing apparatus 3 generates the program-reserve-record setting script in response to a user's instruction input through the portable terminal device 8a. Then, the history of the generation of the program-reserve-record setting script for each user is stored in the database 3b of the program-related information providing apparatus 3.

Figure 8:
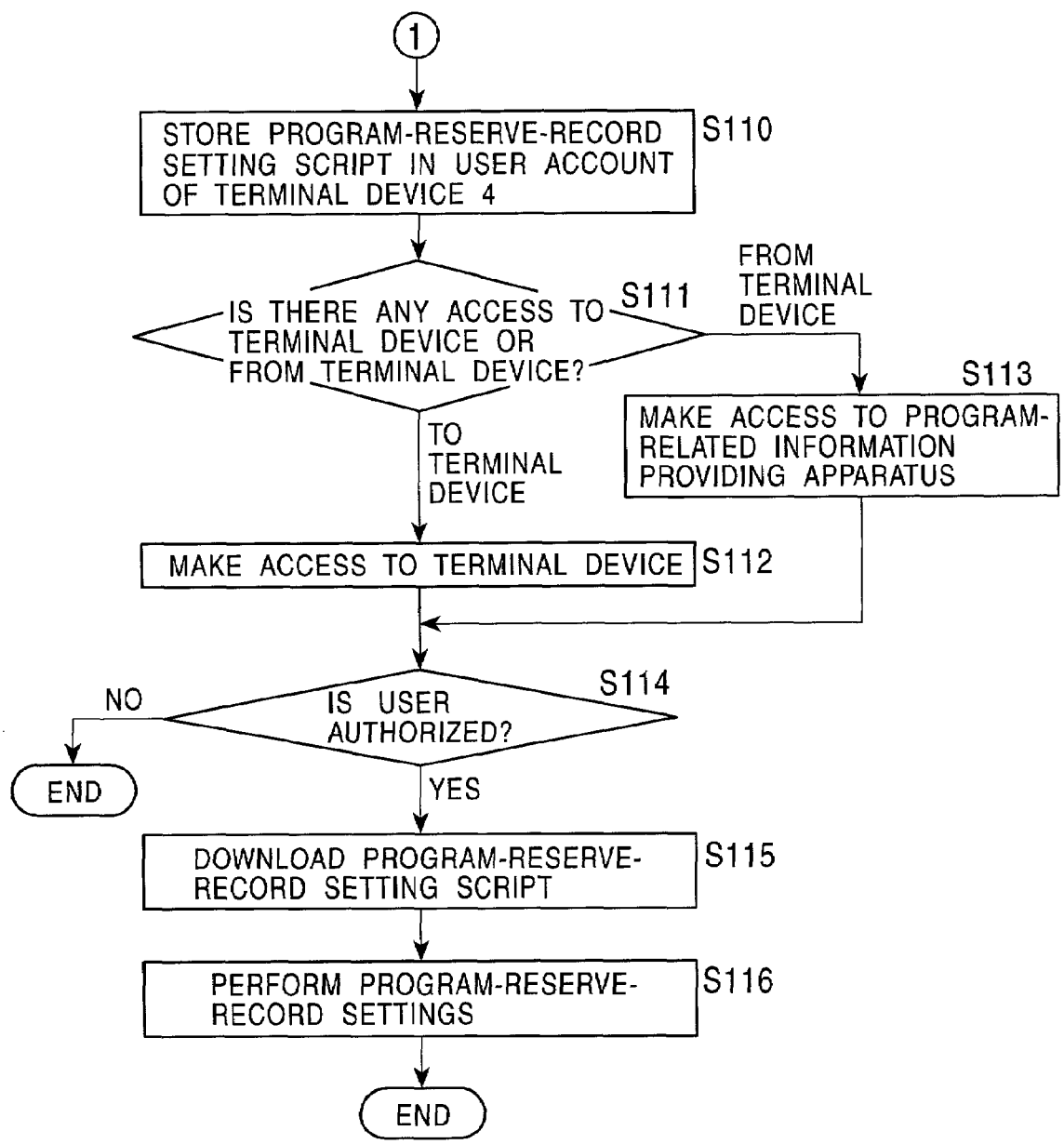

In step S110 of FIG. 8, the control unit of the program-related information providing apparatus 3 stores the program-reserve-record setting script in the user's account of the database 3b.

It is then determined in step S111 whether access is to be made from the program-related information providing apparatus 3 to the terminal device 4 or from the terminal device 4 to the program-related information providing apparatus 3. In the first case, the process proceeds to step S112, and in the second case, the process proceeds to step S113.

In step S112, the control unit of the program-related information providing apparatus 3 accesses the terminal device 4 and establishes a session for sending and receiving data. Immediately after the program-reserve-record setting script is stored in the user's account of the database 3b in step S109, the control unit of the program-related information providing apparatus 3 accesses the terminal device 4. Then, the process proceeds to step S114.

In step S113, the control unit of the terminal device 4 accesses the program-related information providing apparatus 3 and establishes a session for sending and receiving data. The control unit of the terminal device 4 accesses the program-related information providing apparatus 3 at regular intervals, for example, a few times a day, by the settings of the user. Thereafter, the process proceeds to step S114.

In step S114, the program-reserve-record setting script pickup software for picking up the program-reserve-record setting script stored in the recorder of the terminal device 4 is started.

Then, the program-reserve-record setting script pickup software accesses the program-related information providing apparatus 3 so as to download the program-reserve-record setting script stored in the database 3b of the program-related information providing apparatus 3. The control unit of the program-related information providing apparatus 3 performs authentication by determining whether the program-reserve-record setting script pickup software is from a user authorized to use the database 3b. This authentication is performed by using the user ID or the user login ID and the password.

When installing the program-reserve-record setting script pickup software in the terminal device 4, the user registers the user ID or the user login ID and the password, and stores them in the storage unit of the program-related information providing apparatus 3.

If it is found in step S114 that the user is an authorized user, the process proceeds to step S115. If not, the process is terminated.

In step S115, the control unit of the terminal device 4 downloads the program-reserve-record setting script stored in the database 3b by using the program-reserve-record setting script pickup software. The control unit of the program-related information providing apparatus 3 also generates a message indicating that the program-reserve-record setting script has been downloaded by setting a program table account which can be accessed from the terminal device 4 by using the web browser.

Subsequently, in step S116, the control unit of the terminal device 4 obtains the program-reserve-record setting script by using the program-reserve-record setting script pickup software stored in the storage unit, and then, determines whether the device for recording the program indicated by the program-reserve-record setting script is the recorder or the recording unit 5 of the terminal device 4. If the device is the recorder of the terminal device 4, the control unit of the terminal device 4 converts the program-reserve-record setting script into a reserve-record control signal which is suitable for the recorder. If the device is the recording unit 5, the control unit of the terminal device 4 converts the program-reserve-record setting script into a signal which is suitable for the recording unit 5. The recording unit 5 then receives the reserve-record control signal and performs reserve-record settings for the program.

A description is now given of the operation for canceling the program-reserve-record settings based on the program-reserve-record setting script generated in the direct access mode discussed with reference to the flow charts of FIGS. 7 and 8.

Figure 13:
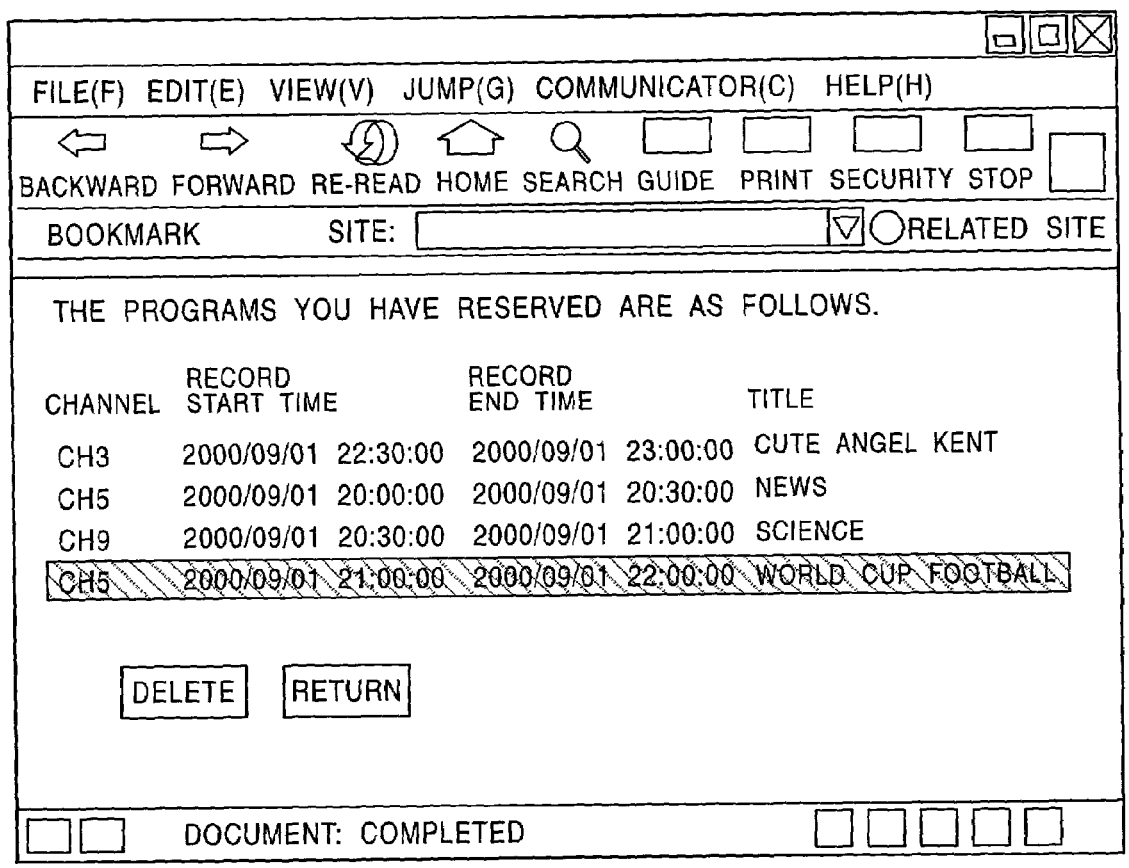
FIG. 13 illustrates an example of a program-reserve-record setting cancel screen provided to a portable terminal device via a web browser in the program-related information providing system shown in FIG. 6.

In order to cancel the program-reserve-record settings which have already been made, a "cancel" button (not shown) of the program table displayed on the display unit 18a of the portable terminal device 8a is selected by using the web browser. In response to the selecting of the "cancel" button, the control unit of the program-related information providing apparatus 3 extracts program-reserve-record histories which have not been recorded by the recorder or the recording unit 5 of the terminal device 4 from the program-reserve-record histories of the corresponding user stored in the database 3b, and displays the extracted histories on the display unit 18a of the portable terminal device 8a. An example of the program-reserve-record histories is shown in FIG. 13. As the program-reserve-record histories, as shown in FIG. 13, the channel to be used for reserve-recording each reserve-record set program is indicated by "channel", for example, "CH1", the program record start time is designated by "record start time", such as "2000/09/01 22:30:00" indicating 22:30, Sep. 1, 2000, the program end time is designated by "record end time", such as "2000/09/01 23:00:00" indicating 23:00, Sep. 1, 2000, and the program name is indicated by the "title", such as "cute angle Kent". In the example shown in FIG. 13, there are four reserve-record set programs, and the titles are "cute angle Kent", "news", "science", and "world cup football".

Then, the user selects the program to be canceled from the program-reserve-record histories, and selects a "delete" button displayed on the display unit 18a. In response to the selection of the "cancel" button of the portable terminal device 8a, the control unit of the program-related information providing apparatus 3 generates a cancel script for canceling the program-reserve-record settings of the selected program. The generated cancel script is sent from the program-related information providing apparatus 3 to the terminal device 4. It is then converted into a signal which is suitable for the recorder or the recording unit 5 of the terminal 4 in which the program-reserve-record settings are made, and is sent to the recorder or the recording unit 5. The recorder or the recording unit 5 then cancels the program-reserve-record settings in accordance with the received signal. The corresponding program-reserve-record history is then deleted, and is registered as a canceled history in the corresponding user account of the database 3b of the program-related information providing apparatus 3.

A description is given below, with reference to the flow charts of FIGS. 7, 8, and 14, of the operation for performing program-reserve-record settings in the program-related information providing system 1, and more specifically, the operation for performing program-reserve-record settings in a first mail access mode by sending e-mail with a URL at regular intervals from the program-related information providing apparatus 3 to the portable terminal device 8b and by using the web browser of the portable terminal device 8b.

Figure 14:
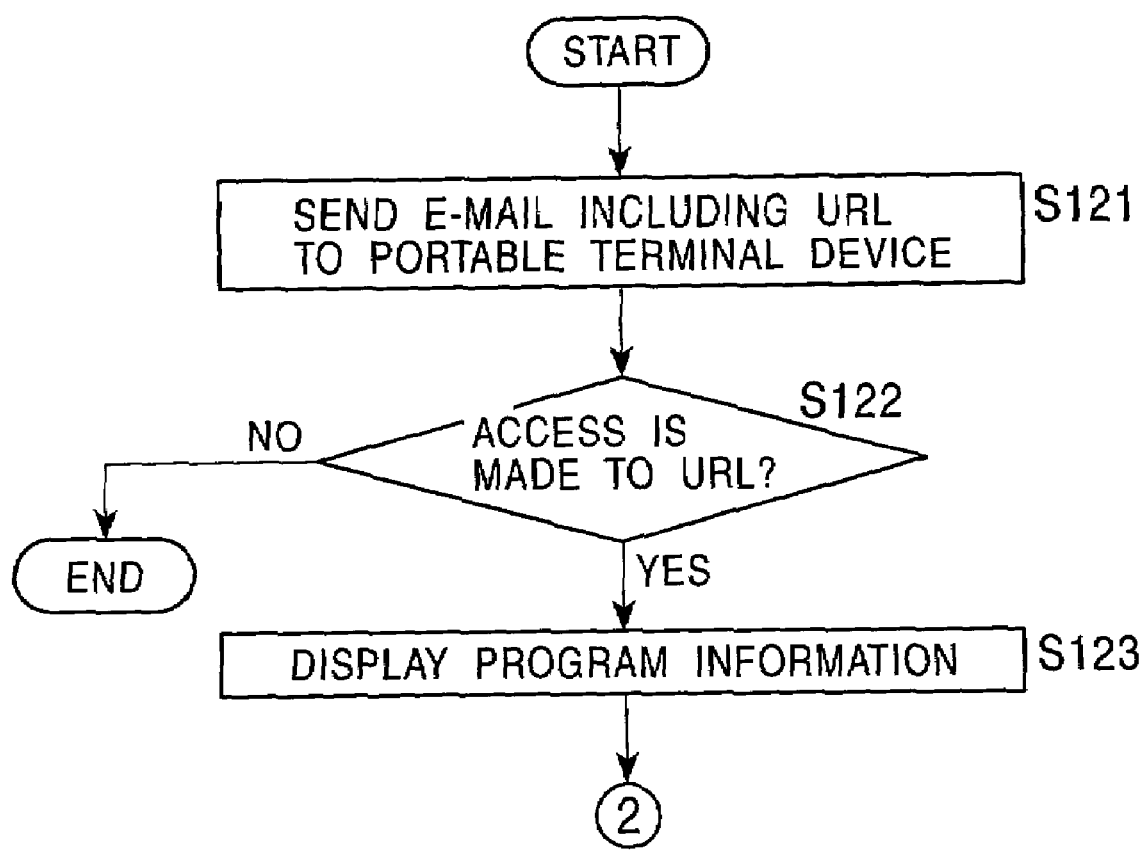
FIG. 14 is a flow chart illustrating the operation for generating a program-reserve-record setting script in the program-related information providing system shown in FIG. 6.
Figure 15:
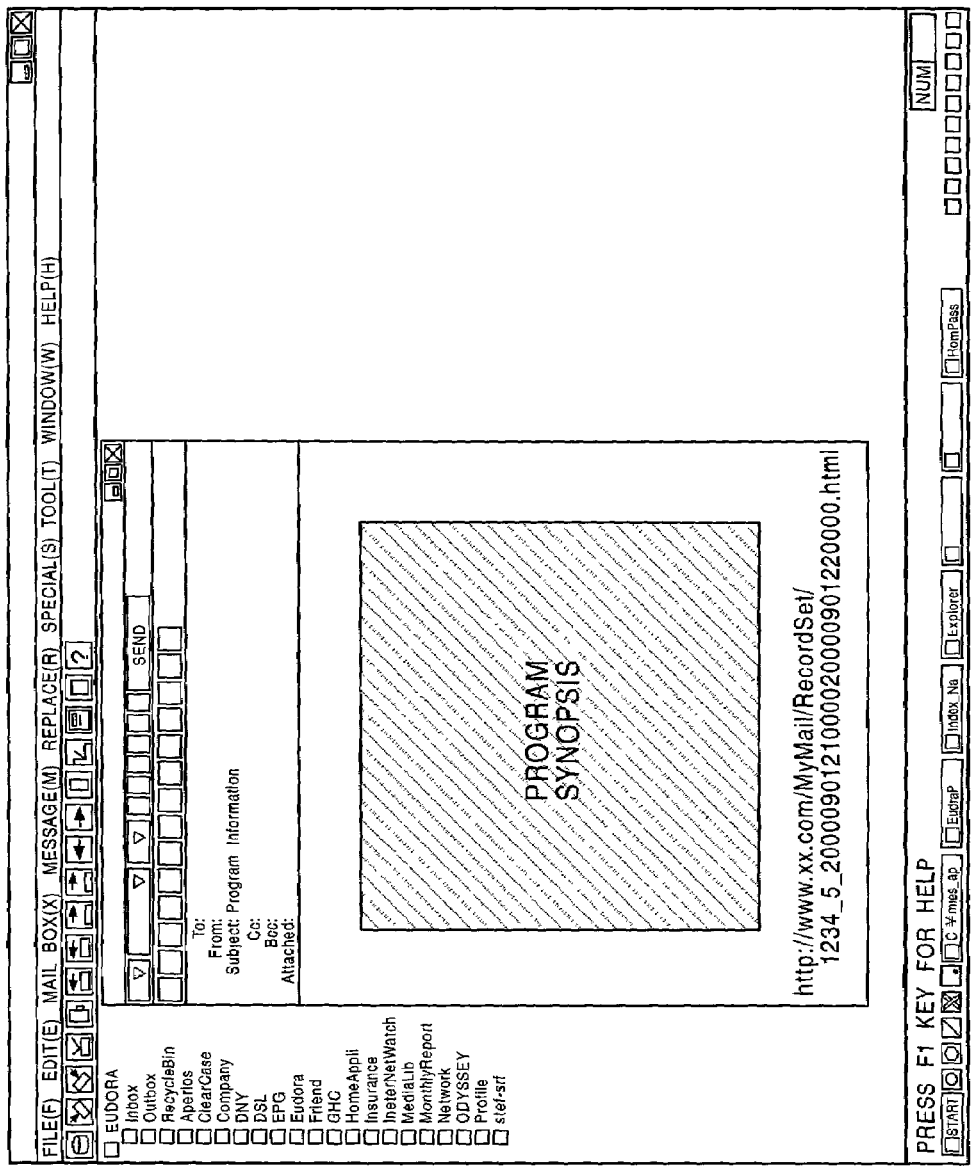
FIG. 15 illustrates an example of e-mail with a program-reserve-record setting URL sent from the program-related information providing apparatus to a portable terminal device in the program-related information providing system shown in FIG. 6.

In step S121 of FIG. 14, the control unit of the program-related information providing apparatus 3 sends via the Internet e-mail including a program synopsis and a URL for each synopsis for specifying the user, the program channel, and the broadcast start time, and the broadcast end time to the portable terminal device 8b. FIG. 15 illustrates an example of e-mail sent from the program-related information providing apparatus 3 to the portable terminal device 8b. The program synopsis is a brief summary of the program, and is shown in the column of the "program synopsis", as indicated by the hatched portion of FIG. 15, though a specific synopsis is not shown. A URL, such as "http://www.xx.com/MyMail/RecordSet/1234_5_20000901210000200 00901220000.html" is also attached to this e-mail. This URL indicates the address of the directory of the database 3a of the program-related information providing apparatus 3 at which the corresponding program information is stored, and also specifies the user and the functions to be executed by accessing this URL. In the URL shown in FIG. 15, "RecordSet" indicates that this URL is for performing program-reserve-record settings, "1234" designates the user identifier for specifying the user utilizing the program-related information providing system 1, the subsequent "5" is the program channel number, "20000901210000" indicates the program start time and date, such as at 21:00, Sep. 1, 2000, and "20000901220000" designates the program end time and date, such as at 22:00, Sep. 1, 2000.

In step S122, it is determined whether access is to be made to the URL attached to the e-mail according to a user's instruction input through the portable terminal device 8b. If the outcome of step S122 is yes, the process proceeds to step S123. If not, the process is ended. For example, if the e-mail shown in FIG. 15 is sent from the program-related information providing apparatus 3 to the portable terminal device 8b, access can be made by selecting the URL indicated by "http://www.xx.com/MyMail/RecordSet/1234_5_20000901210000200 00901220000.html".

In step S123, the control unit of the portable terminal device 8b searches for the program information of the corresponding program stored in the database 3a of the program-related information providing apparatus 3 by using the web browser, and displays it on the display unit 18b. Thereafter, the process proceeds to step S104 shown in FIG. 7, and processing of steps 104 through S116 shown in FIGS. 7 and 8 are executed. The processing performed in steps S104 through S116 in the first mail access mode is similar to those in the direct access mode.

According to the above-described process in the first access mode, by generating the program-reserve-record setting script, the program-reserve-record settings can be made for the recorder or the recording unit 5 of the terminal device 4.

A description is now given of the operation for canceling the program-reserve-record settings based on the program-reserve-record setting script generated in the first mail access mode discussed with reference to FIGS. 7, 8, and 14.

Figure 16:
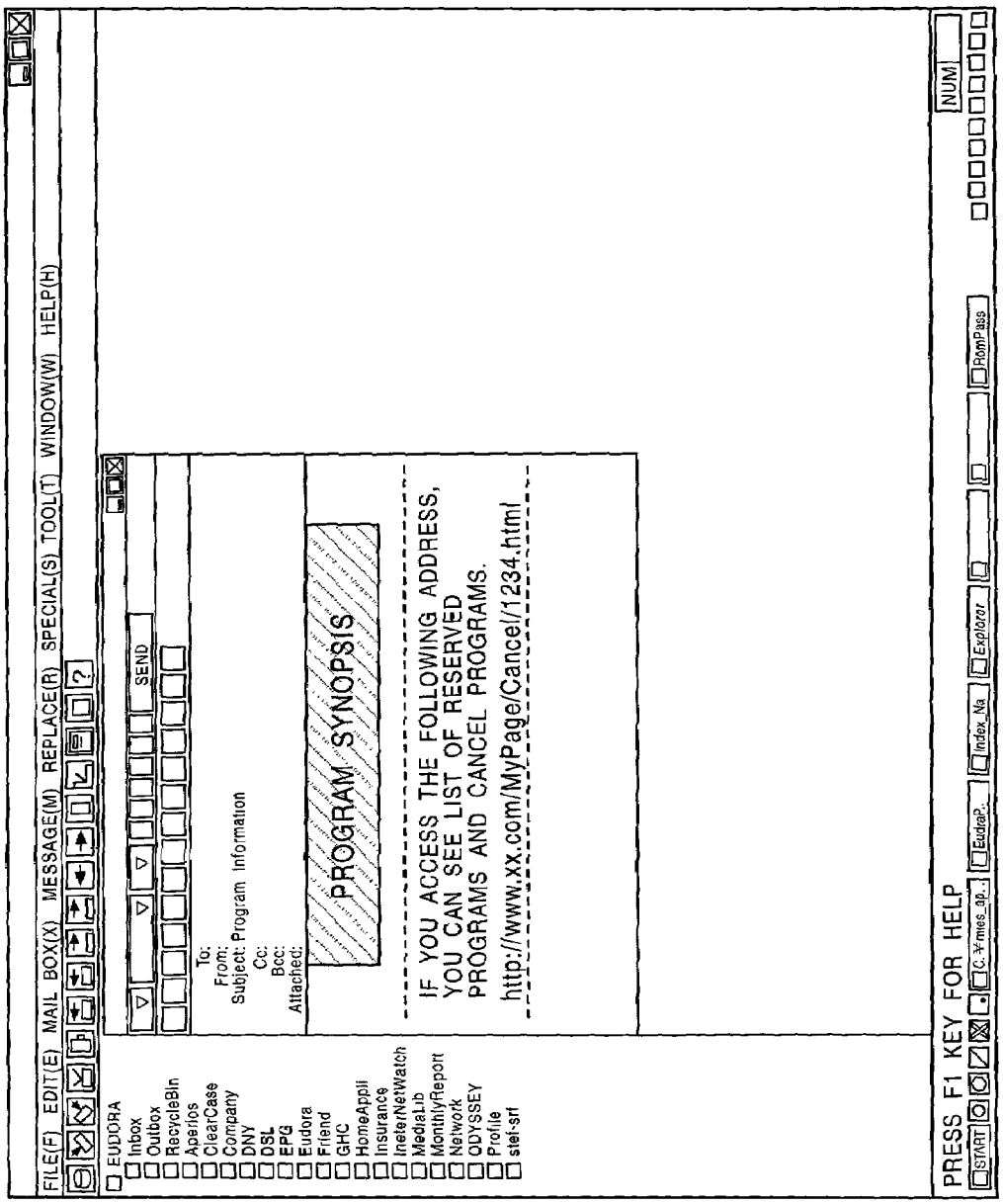
FIG. 16 illustrates an example of e-mail with a program-reserve-record setting cancel mode URL sent from the program-related information providing apparatus to a portable terminal device in the program-related information providing system shown in FIG. 6.

When the program-reserve-record settings of at least one program have been made, a cancel URL, for example, "http://www.xx.com/MyPage/Cancel/1234.html" shown in FIG. 16, is attached to the e-mail sent from the program-related information providing apparatus 3 to the portable terminal device 8b in step S121 of FIG. 14. This cancel URL specifies the user and the functions to be executed by accessing this URL. In this cancel URL shown in FIG. 16, "Cancel" indicates that this URL can be used for canceling the program-reserve-record settings which have already been made, and "1234" indicates the user identifier for specifying the user utilizing the program-related information providing system 1. In order to cancel the program-reserve-record settings, the cancel URL attached to the e-mail is selected by the user via the terminal device 4. In response to the selection of the cancel URL, the control unit of the program-related information providing apparatus 3 extracts program-reserve-record histories which have not been recorded by the recorder or the recording unit 5 of the terminal device 4 from the program-reserve-record histories of the corresponding user stored in the database 3*b*, and delivers the extracted histories to the portable terminal device 8*b*. Accordingly, the control unit of the portable terminal device 8*b* starts the web browser and displays the program-reserve-record histories on the display unit 18*b*. For example, the control unit of the portable terminal device 8*b* displays the histories of the reserve-record set programs shown in FIG. 13 on the display unit 18*b* by using the web browser. By referring to the program history screen displayed on the display unit 18*b*, the user selects the program to be canceled. The program can be canceled by, for example, selecting the "delete" button shown in FIG. 13 after selecting the program. The subsequent canceling operation in the first mail access mode is similar to that in the direct access mode discussed above.

A description is given below, with reference to the flow charts of FIGS. 7, 8, and 17, of the operation for performing program-reserve-record settings in the program-related information providing system 1, and more specifically, the operation for performing program-reserve-record settings in a second mail access mode by sending e-mail having a URL at regular intervals from the program-related information providing apparatus 3 to the portable terminal device 8*c* and by accessing the URL from the portable terminal device 8*c*.

Figure 17:
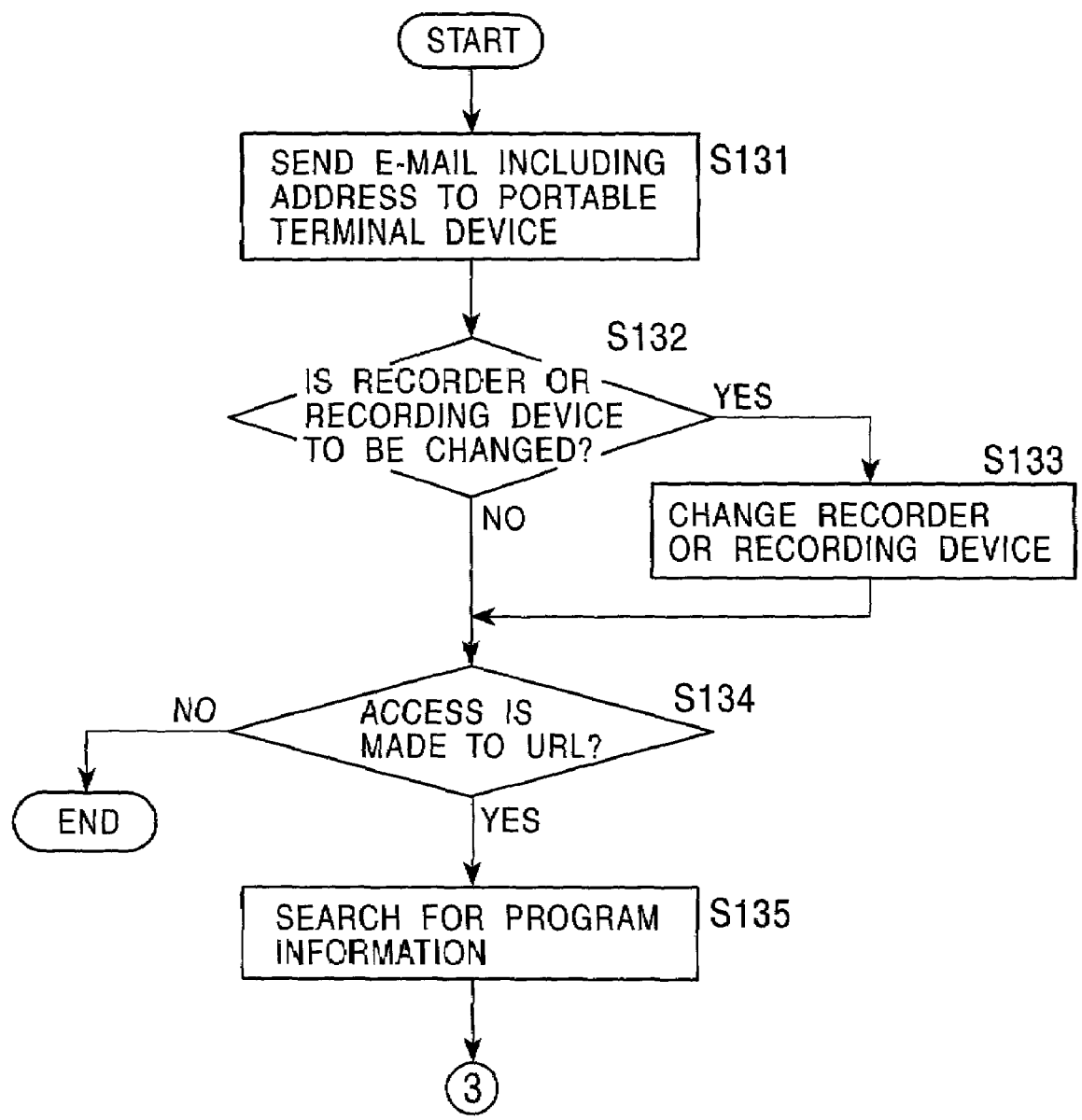
FIG. 17 is a flow chart illustrating the operation for generating a program-reserve-record setting script in the program-related information providing system shown in FIG. 6.

In step S131 of FIG. 17, the control unit of the program-related information providing apparatus 3 sends via the Internet e-mail including a program synopsis and a URL of each synopsis for specifying the user, the program channel, the broadcast start time, and the broadcast end time to the portable terminal device 8*c*. FIG. 17 illustrates an example of e-mail sent from the program-related information providing apparatus 3 to the portable terminal device 8*c*. The program synopsis is indicated in the column of "program synopsis", as indicated by the hatched portion of FIG. 18, though a specific synopsis is not shown.

A program-reserve-record setting URL, such as "http://www.xx.com/MyMail/RecordSet/1234__5__20000901210000200 00901220000.rev" is attached to this e-mail. This URL specifies the user and the functions to be executed by accessing this URL. In the URL shown in FIG. 18, "RecordSet" indicates that this URL is for performing program-reserve-record settings, "1234" designates the user identifier for specifying the user utilizing the program-related information providing system 1, the subsequent "5" is the program channel number, "20000901210000" indicates the program start time and date, such as at 21:00, Sep. 1, 2000, and "2000090122000" designates the program end time and date, such as at 22:00, Sep. 1, 2000.

A recording-device selection mode URL, such as http://www.xx.com/MyMail/ChangeDev/1234.rev, for changing the recorder or the recording device 5 of the terminal device 4 set as the default device to another registered recorder or the recording unit 5 is also attached to the e-mail. If there is only one registered recorder or the recording unit 5, the recording-device selection mode URL is not attached to e-mail.

In step S132, it is determined according to a user's instruction input through the portable terminal device 8*c* whether the default device is to be changed. If the result of step S132 is yes, the process proceeds to step S133. If not, the process proceeds to step S134.

Figure 18:
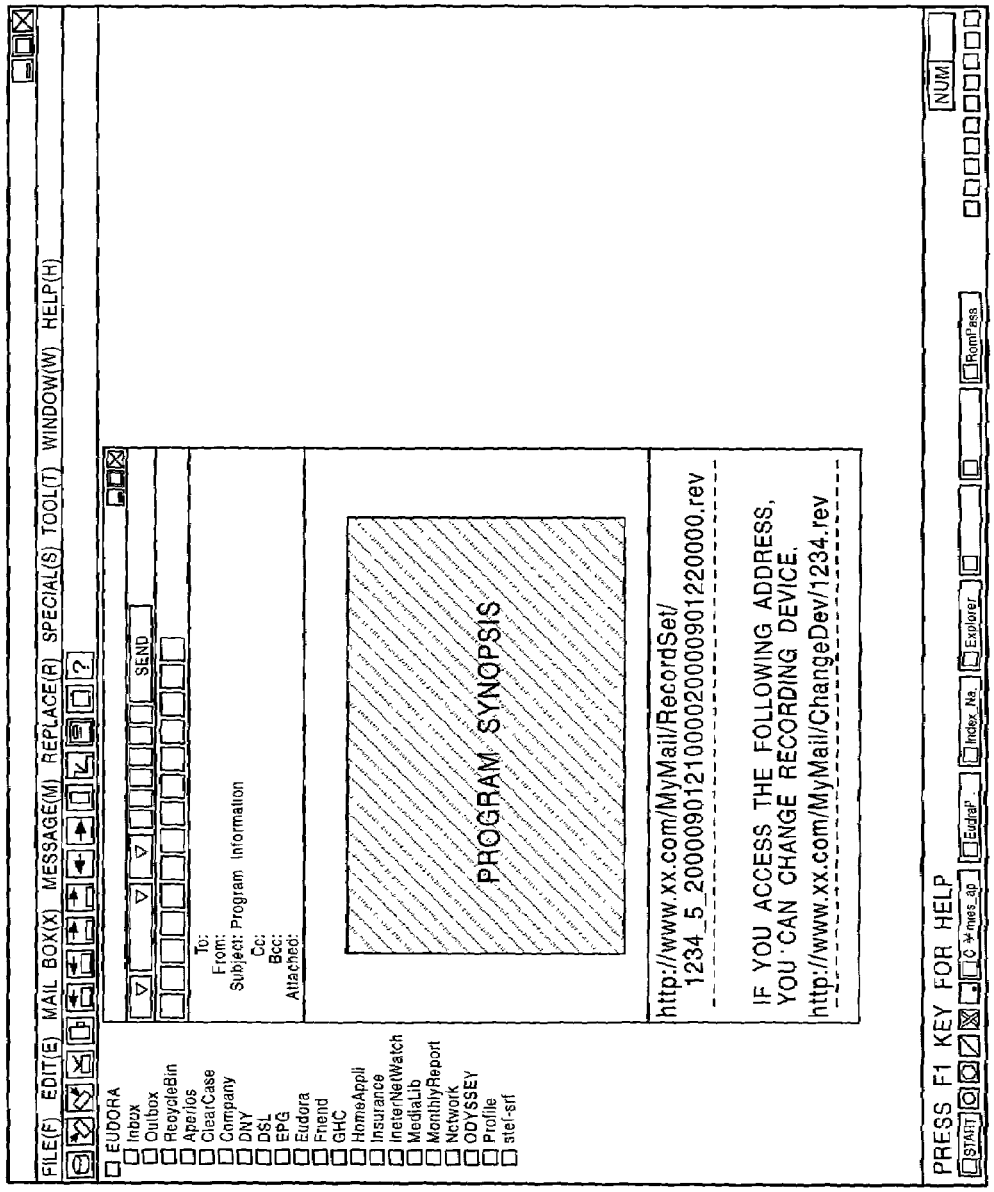
FIG. 18 illustrates an example of e-mail with a recording-device selection mode URL sent from the program-related information providing apparatus to a portable terminal device in the program-related information providing system shown in FIG. 6.

For example, if it is determined in step S132 that the default device is to be changed, the recording-device selection mode URL, such as http://www.xx.com/MyMail/ChangeDev/1234.rev, shown in FIG. 18, is selected so as to enter the recording-device selection mode. Then, the control unit of the program-related information providing apparatus 3 sends the portable terminal device 8*c* recording-device selection e-mail, such as that shown in FIG. 19, including a program-reserve-record setting history and a recording-device selection mode URL for changing the recorder or the recording unit 5 of the terminal device 4 for each program of the program-reserve-record setting history. The recording-device selection mode URL is attached, as shown in FIG. 19, to the recording-device selection e-mail for each reserve-record set program.

Figure 19:
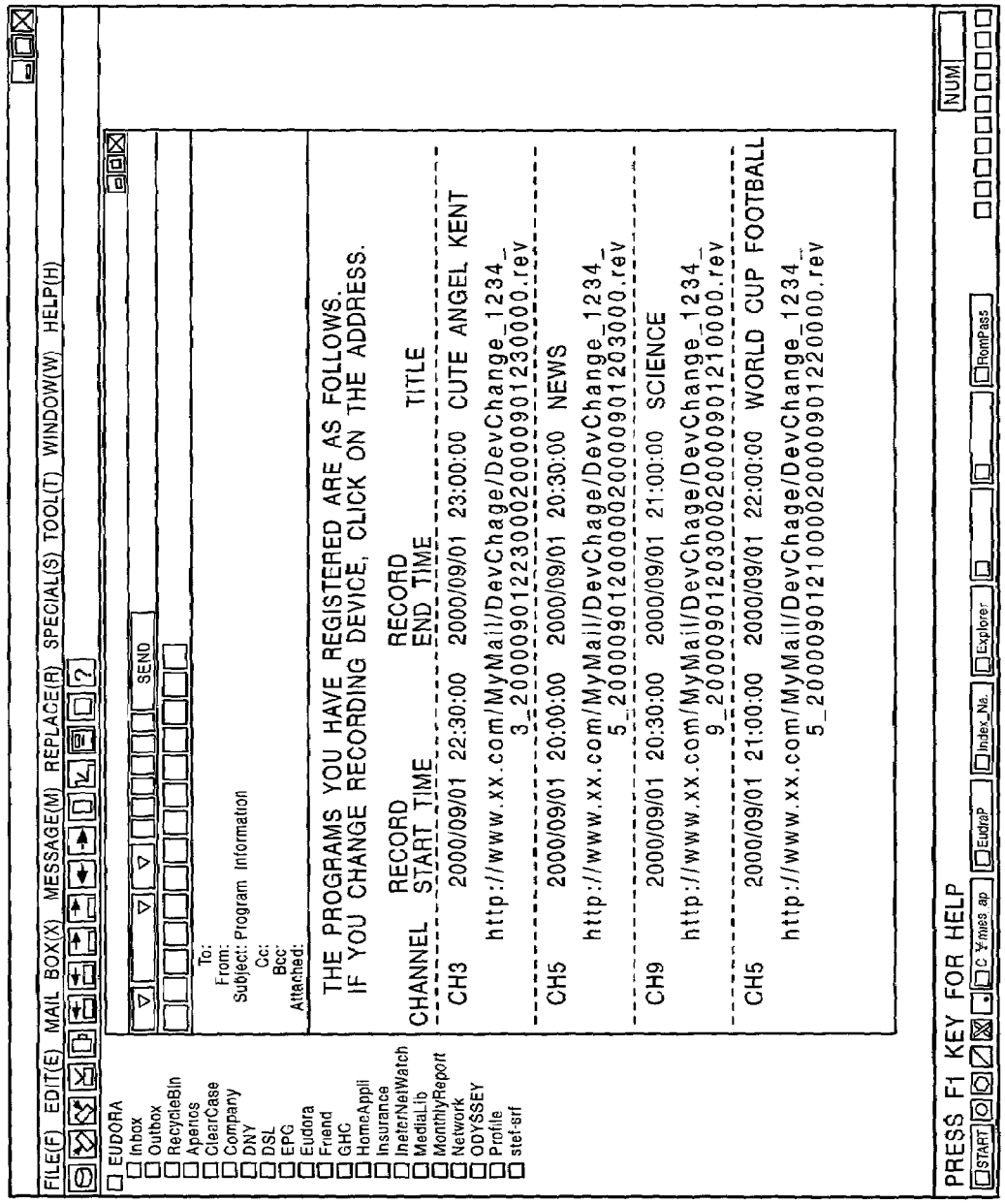
FIG. 19 illustrates an example of e-mail with a recording-device selection mode URL for changing the recording device sent from the program-related information providing apparatus to a portable terminal device in the program-related information providing system shown in FIG. 6.

As the program-reserve-record history, as shown in FIG. 19, the channel to be used for reserve-recording a program is indicated by, for example, "channel", for example, "CH3", the program record start time is designated by "record start time", such as "2000/09/01 22:30:00", the program record end time is designated by "record end time", such as "2000/09/01 23:00:00", and the program name is indicated by the "title", such as "cute angle Kent". A recording-device selection mode URL, such as "http://www.xx.com/MyMail/DevChange/DevChange__1234__3__2000090 12230002000090123000.rev" is attached to each program. This URL specifies the user and the functions to be executed by accessing this URL. In the URL shown in FIG. 19, "DevChange" indicates that this URL is for changing the recorder or the recording unit as the default device, "1234" designates the user identifier for specifying the user utilizing the program-related information providing system 1, the subsequent "3" is the program channel number, "20000901223000" indicates the program start time and date, such as at 22:30, Sep. 1, 2000, and "2000090123000" designates the program end time and date, such as at 23:00, Sep. 1, 2000.

In step S133, the recorder or the recording unit 5 of the terminal device 4 is changed according to a user's instruction input through the portable terminal device 8*c*. When changing the recorder or the recording unit 5, the recording-device selection mode URL attached to each reserve-record set program of the recording-device selection e-mail shown in FIG. 19 is selected so as to enter the recording-device selection mode. For example, when the user selects the recording-device selection mode URL having the program title "world cup football", the control unit of the program-related information providing apparatus 3 sends the portable terminal device 8*c* recording-device selection e-mail having a recording-device setting URL for setting a desired device from the registered recorders or recording units 5.

Figure 20:
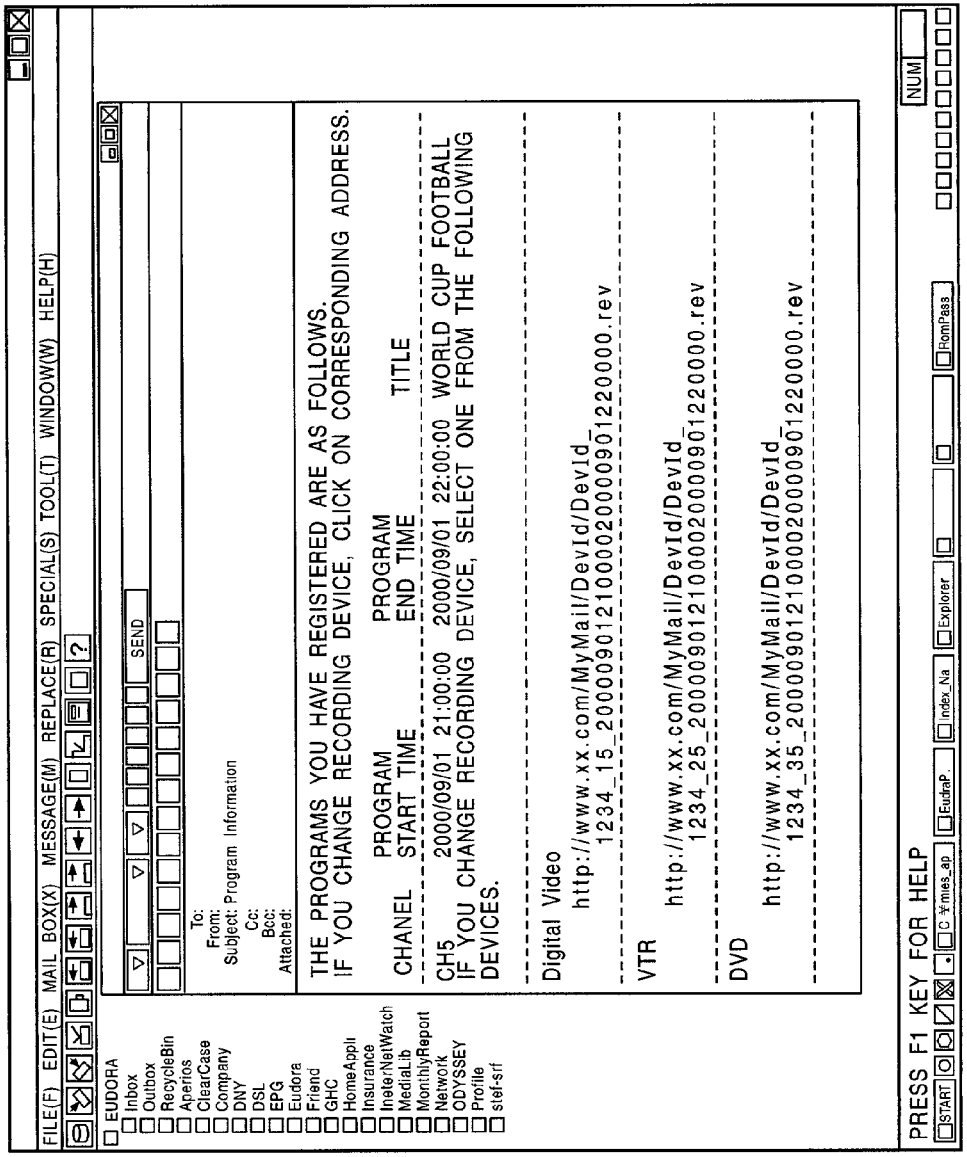
FIG. 20 illustrates an example of e-mail with a recording-device setting URL for changing the recording device sent from the program-related information providing apparatus to a portable terminal device in the program-related information providing system shown in FIG. 6.

Upon receiving the recording-device selection e-mail, the control unit of the portable terminal device 8*c* displays the e-mail, such as that shown in FIG. 20, on the display unit 18*c* by using the mailer stored in the storage unit. The recording-device selection e-mail includes, as shown in FIG. 20, program information of the selected program, such as the "channel", for example, "CH5", the "record start time", for example, "2000/09/01/21:00:00", the "record end time", for example, "2000/09/01/22:00:00", and the "title", for example, "world cup football". The recording-device setting URLs for all the recorders or the recording units 5 registered in the program-related information providing system 1 are displayed. As the recording-device setting URL attached to the recording-device selection e-mail, in the case for a digital video, for example, "http://xx.com/MyMail/DevId/DevId__1234__15__2000090121000020000901220000.rev", is indicated. In the recording-device setting URL for the digital video shown in FIG. 20, "1234" indicates the user identifier of the user utilizing the program-related information providing system 1, "1" of "15" designates the device ID, "5" of "15" designates the program channel number, "20000901210000" indicates the program start time and date, such as 21:00, Sep. 1, 2000, and "20000901220000" indicates the program end time and date, such as 22:00, Sep. 1, 2000. In FIG. 20, as the recorders or the recording units 5 registered in the program-related information providing system 1, three devices, such as a digital video, a VCR, and a DVD, are shown, and the device IDs are indicated by "1", "2", and "3", respectively.

As discussed above, when the recording-device selection e-mail is displayed on the display unit 18c of the portable terminal device 8c, the user selects a desired recording-device setting URL. Then, the corresponding information is sent to the program-related information providing apparatus 3. Thereafter, the control unit of the program-related information providing apparatus 3 changes the default device from the previous recorder or the recording unit to the newly selected recorder or the recording unit, and modifies the program-reserve-record setting script accordingly.

Upon receiving the modified program-reserve-record setting script, the terminal device 4 sets the recorder or the recording unit 5 indicated in the script as the default device accordingly. The process then proceeds to step S134.

In step S134, it is determined whether access is to be made to the program-reserve-record setting URL attached to the e-mail according to a user's response input through the portable terminal device 8c. If the outcome of step S134 is yes, the process proceeds to step S135. If not, the process is ended.

In step S135, in response to the access to the program-reserve-record setting URL, the control unit of the program-related information providing apparatus 3 searches for the corresponding program from the program information stored in the database 3a. Then, the process proceeds to step S109 shown in FIG. 7, and processing in steps S109 through S116 is performed.

The processing in steps S109 through S116 in the second mail access mode is similar to that in the direct access mode. According to the above-described process in the second mail access mode, by generating the program-reserve-record setting script, the program-reserve-record settings can be made for the recorder or the recording unit 5 of the terminal device 4.

A description is now given of the operation for canceling the program-reserve-record settings based on the program-reserve-record script generated in the second mail access mode discussed with reference to FIGS. 7, 8, and 17.

Figure 21:
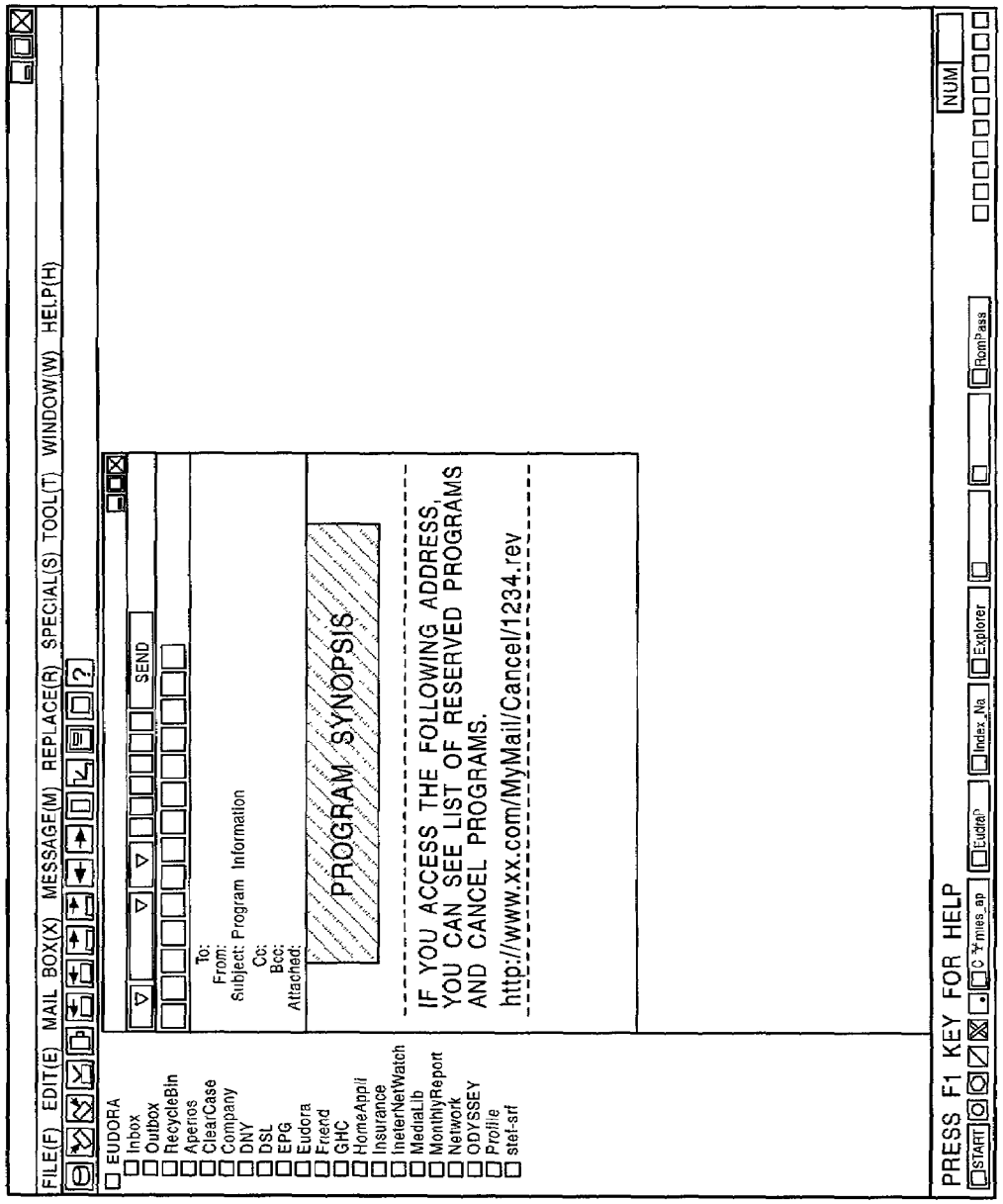
FIG. 21 illustrates an example of e-mail with a program-reserve-record setting cancel mode URL sent from the program-related information providing apparatus to a portable terminal device in the program-related information providing system shown in FIG. 6.

If the program-reserve-record settings of at least one program are made, a cancel URL, for example, http://www.xx.com/MyMail/Cancel/1234.rev, as shown in FIG. 21, is attached to the e-mail sent from the program-related information providing apparatus 3 to the portable terminal device 8c in step S131. This cancel URL specifies the user and the functions executed by accessing this URL.

Figure 22:
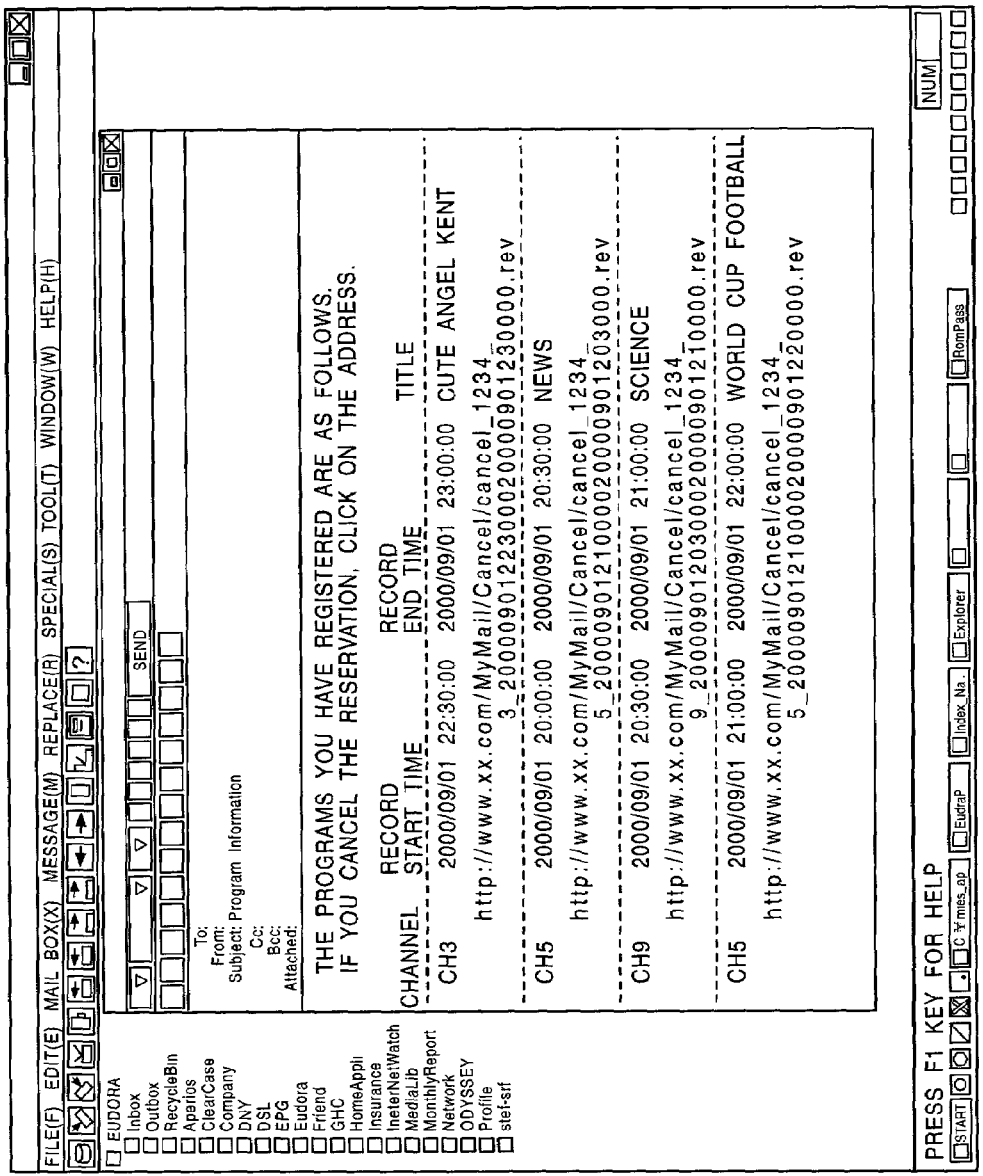
FIG. 22 illustrates an example of e-mail with a URL for canceling a reserve-record set program sent from the program-related information providing apparatus to a portable terminal device in the program-related information providing system shown in FIG. 6.

In the cancel URL shown in FIG. 21, the "Cancel" indicates that this URL serves to cancel the program reserve-record settings, and "1234" designates the user identifier of the user utilizing the program-related information providing system 1. The program-reserve-record settings can be canceled by selecting the cancel URL attached to the e-mail by the user via the portable terminal device 8c. In response to the selection of the cancel URL, the control unit of the program-related information providing apparatus 3 extracts program-reserve-record histories which have not been recorded by the recorder or the recording unit 5 of the terminal device 4 from the program-reserve-record histories stored in the database 3b for the corresponding user. The control unit then generates program-reserve-record setting cancel e-mail with the cancel URLs, and sends the e-mail to the portable terminal device 8c. Then, the control unit of the portable terminal device 8c displays the e-mail on the display unit 18c by using the mailer stored in the storage unit. For example, the control unit of the portable terminal device 8c displays the program-reserve-record setting cancel e-mail, such as that shown in FIG. 22, on the display unit 18c. This e-mail indicates, as the program information of the reserve-record set programs, the "program", such as "CH3", the "record start time", such as "2000/09/01 22:30:00", the "record end time", such as "2000/09/01 23:00:00", and the "title", such as "cute angle Kent". The program-reserve-record setting cancel URL, such as "http://www.xx.com/MyMail/Cancel/cancel_1234_3_2000090122300 020000901230000.rev", is also indicated in this e-mail. This URL specifies the user and the functions executed by accessing this URL. In the program-reserve-record setting cancel URL, the "Cancel" indicates that this URL serves to cancel the program-reserve-record settings, "1234" designates the user identifier of the user utilizing the program-related information providing system 1, the subsequent "3" indicates the program channel number, "20000901223000" designates the program start time and date, such as "22:30, Sep. 1, 2000", and "20000901230000" indicates the program end time and date, such as "23:00, Sep. 1, 2000".

Subsequently, the user selects a program to be canceled from the reserve-record set programs displayed on the display unit 18c of the portable terminal device 8c. Then, the corresponding information is sent to the program-related information providing apparatus 3, and the control unit of the program-related information providing apparatus 3 generates a cancel script for canceling the program-reserve-record settings of the selected program. The generated cancel script is sent from the program-related information providing apparatus 3 to the terminal device 4, and is converted into a signal which is suitable for the recorder or the recording unit 5 of the terminal device 4. The converted signal is then transmitted to the recorder or the recording unit 5 of the terminal device 4. In response to this signal, the recorder or the recording unit 5 cancels the program-reserve-record settings. Then, the corresponding program-reserve-record history is deleted, and is registered as the cancel history in the user account of the database 3b of the program-related information providing apparatus 3.

Figure 23:
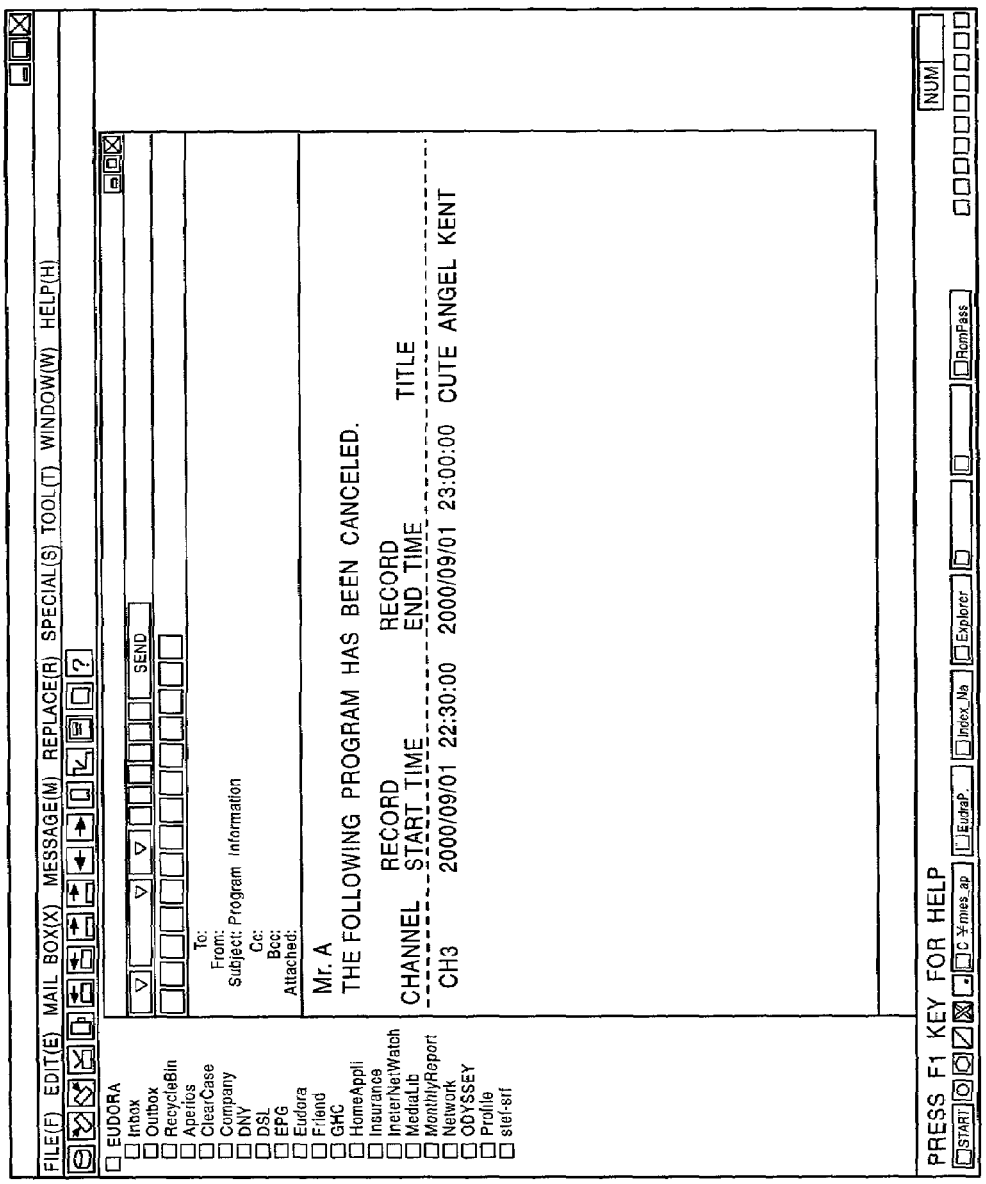
FIG. 23 illustrates an example of e-mail indicating that program-reserve-record settings have been successfully canceled sent from the program-related information providing apparatus to a portable terminal device in the program-related information providing system shown in FIG. 6.

At the same time the control unit of the program-related information providing apparatus 3 generates the cancel script, it sends the portable terminal device 8c confirmation e-mail indicating that the program-reserve-record settings have been canceled. The control unit of the portable terminal device 8c displays, for example, the confirmation e-mail shown in FIG. 23, on the display unit 18c. The confirmation e-mail indicates, as shown in FIG. 23, for example, the "channel" of the canceled program, "record start time", "record end time", and "title".

As described above, in the program-related information providing system 1, the program table stored in the database 3a of the program-related information providing apparatus 3 is sent and displayed on the display unit 18a of the portable terminal device 8a via the web browser, thereby enabling the user to view the program table. Thus, the user is able to input a program reserve-record request of the desired program through the portable terminal device 8a. In response to this request from the user, the program-related information providing apparatus 3 generates a program reserve-record setting script. As a result, the program-reserve-record settings can be made for the recorder or the recording unit 5 of the terminal device 4.

In the program-related information providing system 1, e-mail having the program information stored in the database 3a and URLs linked to such program information is also sent to the portable terminal device 8b or 8c. Then, the user is able to select the URL through the portable terminal device 8b or 8c. In response to the access to the URL, the program-related information providing apparatus 3 generates the program-reserve-record setting script. As a result, the program-reserve-record settings can be made for the recorder or the recording unit 5 of the terminal device 4.

In the above-described direct access mode, the first mail access mode, and the second mail access mode, the program-reserve-record settings may be performed by sending and receiving http-based information with the use of a common gateway interface (CGI) in the program-related information providing apparatus 3.

The CGI is an interface used in a server-client network. More specifically, a WWW server starts a program in response to a client's request, and sends back a result obtained by executing this program to the client. The program started by the WWW server is referred to as a "CGI script".

In the aforementioned direct access mode, the first mail access mode, and the second mail access mode, the program for generating the program-reserve-record setting script or the cancel script corresponds to the CGI script. The CGI script is stored in the storage unit of the program-related information providing apparatus 3. In the direct access mode, the program is started by being accessed from the program table. In the first and second mail access modes, the program is started by selecting the URL attached to e-mail sent to the portable terminal device 8b or 8c.

The URL for starting the CGI script, which is attached to the e-mail sent to the portable terminal device 8b in the first access mode, is discussed below. As discussed in step S121 of FIG. 14, the program-related information providing apparatus 3 sends e-mail with a program synopsis and a URL indicating the program channel, the broadcast start time, and the broadcast end time to the portable terminal device 8b via the Internet. If the CGI is used in the program-related information providing apparatus 3, a URL, for example, "http://www.xx.com/MyMail/Record.cgi?userID=1234&InfraID=1&StationID=3&start=20000901210000&end=20000901220000" is attached to the e-mail instead of a URL, for example, "http://www.xx.com/MyMail/RecordSet/1234_5_20000901210000200 00901220000.html".

This URL indicates the address of the CGI on the web server, and the address after "?" in this URL indicates arguments for starting the CGI script.

The arguments are assigned, for example, as follows. The "userID" indicating the identifier of the user utilizing the program-related information providing system 1 is "userID=1234". The "InfraID" indicating the broadcast means, such as "1" for terrestrial broadcasting, "2" for CS broadcasting, and "3" for BS broadcasting, is "InfraID=1". The "StationID" indicating the channel number corresponding to the frequency assigned to the broadcast station is "StationID=3". The "start" indicating the broadcast start time and date is "start=20000901210000" if it is 21:00, Sep. 1, 2000. The "end" indicating the broadcast end time and date is "end=20000901220000" if it is 22:00, Sep. 1, 2000. The above-described arguments are connected by "&".

By accessing this URL, a program-reserve-record setting script is generated, and program reserve-record settings can be performed as follows.

When the user selects the URL via the portable terminal device 8b, a script generating command for generating a program-reserve-record setting script, and program information including the broadcast station, the broadcast means, the broadcast start time and date, and the broadcast end time and date are sent to the program-related information providing apparatus 3, and are stored in the user's account of the database 3b.

The terminal device 4 is operated by a timer and a power control function at regular intervals, so that an Internet session is established between the program-related information providing apparatus 3 and the terminal device 4.

Then, the program-reserve-record setting script pickup software stored in the storage unit of the terminal device 4 accesses the program-related information providing apparatus 3 by using authentication information, such as the user login ID and the password. The software then performs user authentication to use the CGI script for generating a program-reserve-record setting script. Upon completing user authentication, the CGI script generates a program-reserve-record setting script from the script generation command stored in the user account of the database 3b and the program information, and sends the generated script to the terminal device 4. The terminal device 4 then receives the program-reserve-record setting script and sends it to the recorder or the recording unit 5 of the terminal device 4. Thus, program-reserve-record settings can be made.

After performing the program-reserve-record settings by using the program-reserve-record setting script, the program-related information providing apparatus 3 informs the portable terminal device 8b whether the program-reserve-record settings have been successfully performed.

More specifically, after the program-reserve-record settings have been performed, the terminal device 4 first accesses the program-related information providing apparatus 3 by using the authentication information, and performs user authentication to use a program-reserve-record setting result report CG script for reporting a setting result to the portable terminal device 8b. The program-reserve-record setting result report CG script is stored in the storage unit of the program-related information providing apparatus 3. Upon completion of user authentication, the program-reserve-record setting result report CGI script generates e-mail including a result report indicating whether the program-reserve-record settings have been successfully performed by using program information as arguments, and sends the e-mail to the portable terminal device 8b.

The terminal device 4 then sends the program information of the reserve-record set program to the program-related information providing apparatus 3, and allows it to generate the history of the reserve-record set program.

More specifically, the terminal device 4 first accesses the program-related information providing apparatus 3 by using authentication information. The terminal device 4 then performs user authentication to use a program-reserve-record history generating CGI script for generating the history of the reserve-record set program. The program-reserve-record history generating CGI script is stored in the storage unit of the program-related information providing apparatus 3. Upon completing user authentication, the program-reserve-record history generating CGI script generates the history of the reserve-record set program by using the program information as arguments. The generated history is then sent to the terminal device 4, and stored in the storage unit of the terminal device 4.

The terminal device 4 also sends the program information of the program recorded in a recording medium by the recorder or the recording unit 5 to the program-related information providing apparatus 3, and allows the program-related information providing apparatus 3 to generate the history of the program recorded in the recording medium.

More specifically, the terminal device 4 first accesses the program-related information providing apparatus 3 by using authentication information. The terminal device 4 then performs user authentication to use a program-reserve-recorded history generating CGI script for generating the history of the program recorded in the recording medium. The program-reserve-recorded history generating CGI script is stored in the storage unit of the program-related information providing apparatus 3. Upon completion of user authentication, the program-reserve-recorded history generating CGI script generates the program-reserve-recorded history by using the program information of the recorded program as arguments. The generated history is then sent to the terminal device 4, and is stored in the storage unit of the terminal device 4.

According to the http or http-based communication by using the CGIs in the program-related information providing apparatus 3 as discussed above, the recorder or the recording device 5 of the terminal device 4 set as the default device can also be changed.

Additionally, the above-described process for generating the program-reserve-record setting script may also be applicable for generating a cancel script. A cancel CGI script stored in the storage unit of the program-related information providing apparatus 3 can be accessed by selecting the cancel URL attached to e-mail sent to the portable terminal device 8*b*. Then, a cancel script for canceling the program-reserve-record settings made in the recorder or the recording device 5 of the terminal device 4 can be generated.

As in the first mail access mode, in the direct access mode using the portable terminal device 8*a* and the second mail access mode using the portable terminal device 8*c*, the program-reserve-record settings can be performed or canceled by using the program-reserve-record setting CGI script or the cancel CGI script, respectively, and the recorder or the recording device 5 set as the default device can be changed.

As described above, communication between the program-related information providing apparatus 3 and the terminal device 4 between which an Internet session has been established is performed according to an http protocol or an https protocol provided with a security function. Various CGI scripts stored in the storage unit of the program-related information providing apparatus 3 are used. With this arrangement, the operability in performing the program-reserve-record settings in the program-related information providing system 1 can be improved. It is also possible to enhance the safety from leakage of information.

When performing communication, such as sending and receiving sensitive information, among the portable terminal devices 8*a*, 8*b*, and 8*c*, the program-related information providing apparatus 3, and the terminal device 4 among which an Internet session has been established, https may be used as the communication protocol, thereby enhancing the safety. As a result, it is possible to prevent leakage of sensitive information.

Accounting (billing) processing performed in the program-related information providing system 1 is discussed below.

The program-related information providing apparatus 3 in the program-related information providing system 1 shown in FIG. 1 or 6 is provided with an accounting processing (billing) device (not shown). In response to the setting or canceling of a program recording reservation made in the recorder or the recording unit 5 of the terminal device 4 by the user, the accounting processing device performs accounting processing for such setting or canceling. According to this accounting processing, accounting (billing) is performed when program-reserve-record settings are made, and accounting (billing) is canceled when program-reserve-record settings are canceled.

It is now assumed that a program-reserve-record setting script or a program-reserve-record setting cancel script generated in the program-related information providing apparatus 3 is sent to the terminal device 4, and that the program-reserve-record settings are performed by the program-reserve-record setting script or the program-reserve-record settings are canceled by the program-reserve-record setting cancel script. In this case, the program-reserve-record setting script pickup software stored in the storage unit of the terminal device 4 accesses the above-described program-reserve-record setting result report CGI script stored in the storage unit of the program-related information providing apparatus 3 by using program information and user authentication information as arguments. In response to this access, the program-reserve-record setting result report CGI script generates e-mail indicating that the program-reserve-record settings have been made or canceled, and sends the e-mail to the portable terminal device 8*a*, 8*b*, or 8*c*. At the same time, the control unit of the program-related information providing apparatus 3 has determined that accounting processing is required, and performs the accounting operation for the user accordingly.

The billing amount charged by the accounting processing device to the terminal device 4 is different according to whether the program-related information providing apparatus 3 or the terminal device 4 accesses a telephone line to establish an Internet session therebetween. As discussed in step S112 of FIG. 8, if the program-related information apparatus 3 accesses the terminal device 4, the total billing of a fee for the use of the program-related information providing system 1 and a telephone fee is billed from the accounting processing device to the terminal device 4. In contrast, as discussed in step S113 of FIG. 8, if the terminal device 4 accesses the program-related information apparatus 3, the telephone fee is directly billed from a telephone company to the terminal device 4. Accordingly, only a fee for the use of the program-related information providing system 1 is billed from the accounting processing apparatus 3 to the terminal device 4.

As described above, in the program-related information providing system 1, program-reserve-record settings of a program can be made for the recorder or the recording unit 5 of the terminal device 4 through the portable terminal device 8*a*, 8*b*, or 8*c*. Additionally, by the provision of the accounting processing device, accounting processing can be performed for the user utilizing the program-related information providing system 1.

When generating the program-reserve-record setting script or the program-related information script in the reserve-record mode or the on-air mode, respectively, the program-related information providing apparatus 3 is able to indicate URLs in the URL list description area 20*b* in response to a request from the program-related information providing server 6.

It is now assumed that a product sales company owning the program-related information providing server 6 attempts to sell predetermined products to the users via the terminal device 4. In this case, the company pays money to the program-related information providing apparatus 3, and requests it to post a URL indicating the address for the product information in the URL list description area 20b. Then, the company is able to advertise the products. Such products are closely related to the program, and there is a high possibility of attracting the users watching the program.

Since the program-related information providing apparatus 3 manages user information, the program-information providing server 6 is able to aggressively and actively advertise the products to specific users. The program-related information providing apparatus 3 collects an advertising fee from the program-related information providing server 6 for posting the URL, and uses it for managing the program-related information providing system 1. Thus, the program-related information providing apparatus 3 is able to reduce the fee for the use of the system 1 or make it free of charge. As a result, the number of subscribers to the program-related information providing system 1 through the terminal device 4 is increased, and the advertising effect for the program-related information providing server 6 is enhanced accordingly, producing the synergetic effect.

If the user wants to purchase a product in the URL indicated by the program-related information providing apparatus 3 via the network 7, the user is easily able to conduct sales and purchase procedure with the program-related information providing server 6 by accessing the URL.

When the user is watching a popular program sent from the broadcast station 2 in real time, the number of accesses to the URL which provides the program-related information may sometimes be drastically increased, and accordingly, the traffic of the network 7 becomes very busy. If the traffic of the network 7 is predictable, a comment which specifies the access time for each user may be attached to the URL indicating the address of the program-related information to be displayed by using the program-related information display browser. This enables the user to access the URL at the specified time, thereby solving the problem of a traffic jam.

Although in this embodiment the portable terminal devices 8a, 8b, and 8c have different functions, they may possess the functions of the other devices.

In this embodiment, a command for generating a program-reserve-record setting script is input through the portable terminal device 8a, 8b, or 8c, such as a cellular telephone, a PDA, or a portable PC. However, a PC having the same functions as those of the portable terminal device 8a, 8b, or 8c may be used to input such a command.

What is claimed is:

1. A program-related information providing apparatus which includes storage means for storing program information, which serves as attribute information of a program, and a program table, and which sends the program information and the program table to a terminal device via a network in response to a request from said terminal device, said program-related information providing apparatus comprising:
    search means for searching for the program information stored in said storage means in response to a program-reserve-record setting request for a program in the program table from said terminal device;
    first program-reserve-record setting script generation means for generating a first program-reserve-record setting script, which serves as a control command for recording the program in the program table on a recording medium, based on the program information searched by said search means;
    program-related information address display script generation means for generating a program-related information address display script including address information which indicates an address on said network of program-related information of the program in the program table and from which the program-related information is accessible, and also including display time information specifying a display time of the address information, said program-related information address display script serving as a control command for displaying the address information on said terminal device;
    second program-reserve-record setting script generation means for generating a second program-reserve-record setting script by attaching said program-related information address display script to said first program-reserve-record setting script; and
    transmission means for transmitting said second program-reserve-record setting script generated by said second program-reserve-record setting script generation means to said terminal device.

2. A program-related information providing apparatus according to claim 1, wherein said program-related information address display script generation means uses, as the display time information of the program-related information address display script, display start time information specifying a display timing of the address information relative to a program broadcast start time, and display period information specifying a period for which the address information is displayed.

3. The program-related information providing apparatus according to claim 1, further comprising;
    reception permission means for permitting said terminal device to receive a program in the program table in response to a program viewing request sent from said terminal device.

4. A program-related information providing method for use in a program-related information providing apparatus which includes storage means for storing program information, which serves as attribute information of a program, and a program table, and which sends the program information and the program table to a terminal device via a network in response to a request from said terminal device, said program-related information providing method comprising the steps of:
    searching for the program information stored in said storage means in response to a program-reserve-record setting request for a program in the program table from said terminal device;
    generating a first program-reserve-record setting script, which serves as a control command for recording the program in the program table on a recording medium, based on the searched program information;
    generating a program-related information address display script including address information which indicates an address on said network of program-related information of the program in the program table and from which the program-related information is accessible, and also including display time information specifying a display time of the address information, said program-related information address display script serving as a control command for displaying the address information on said terminal device;
    generating a second program-reserve-record setting script by attaching said program-related information address display script to said first program-reserve-record setting script; and
    transmitting said second program-reserve-record setting script to said terminal device.

5. A program-related information providing method according to claim 4, wherein as the display time information of the program-related information address display script, display start time information specifying a display timing of the address information relative to a program broadcast start time, and display period information specifying a period for which the address information is displayed are used.

6. The program-related information providing method according to claim 3, further comprising;

permitting said terminal device to receive a program in the program table in response to a program viewing request sent from said terminal device.

7. A program-related information providing apparatus which includes storage means for storing program information, which serves as attribute information of a program, and a program table, and which sends the program information and the program table to a first terminal device via a network in response to a request from said first terminal device, said program-related information providing apparatus comprising:

search means for searching for the program information stored in said storage means in response to a program-reserve-record setting request for a program in the program table from said first terminal device;

first program-reserve-record setting script generation means for generating a first program-reserve-record setting script, which serves as a control command for recording the program in the program table on a recording medium, based on the program information searched by said search means;

program-related information address display script generation means for generating a program-related information address display script including address information which indicates an address on said network of program-related information of the program in the program table and from which the program-related information is accessible, and also including display time information specifying a display time of the address information, said program-related information address display script serving as a control command for displaying the address information on a second terminal device;

second program-reserve-record setting script generation means for generating a second program-reserve-record setting script by attaching said program-related information address display script to said first program-reserve-record setting script; and transmission means for transmitting said second program-reserve-record setting script generated by said second program-reserve-record setting script generation means to said second terminal device.

8. A program-related information providing apparatus according to claim 7, wherein said program-related information address display script generation means uses, as the display time information of the program-related information address display script, display start time information specifying a display timing of the address information relative to a program broadcast start time, and display period information specifying a period for which the address information is displayed.

9. The program-related information providing apparatus according to claim 7, further comprising;

reception permission means for permitting said terminal device to receive a program in the program table in response to a program viewing request sent from said terminal device.

10. A program-related information providing method for use in a program-related information providing apparatus which includes storage means for storing program information, which serves as attribute information of a program, and a program table, and which sends the program information and the program table to a first terminal device via a network in response to a request from said first terminal device, said program-related information providing method comprising the steps of:

searching for the program information stored in said storage means in response to a program-reserve-record setting request for a program in the program table from said first terminal device;

generating a first program-reserve-record setting script, which serves as a control command for recording the program in the program table on a recording medium, based on the searched program information;

generating a program-related information address display script including address information which indicates an address on said network of program-related information of the program in the program table and from which the program-related information is accessible, and also including display time information specifying a display time of the address information, said program-related information address display script serving as a control command for displaying the address information on a second terminal device;

generating a second program-reserve-record setting script by attaching said program-related information address display script to said first program-reserve-record setting script; and transmitting said second program-reserve-record setting script to said second terminal device.

11. A program-related information providing method according to claim 10, wherein as the display time information of the program-related information address display script, display start time information specifying a display timing of the address information relative to a program broadcast start time, and display period information specifying a period for which the address information is displayed are used.

12. The program-related information providing method according to claim 10, further comprising;

permitting said terminal device to receive a program in the program table in response to a program viewing request sent from said terminal device.

13. A program-related information providing system comprising a program-related information providing apparatus and a terminal device connected to each other via a network, said program-related information providing apparatus including storage means for storing program information, which serves as attribute information of a program, and a program table, and said program-related information providing apparatus sending the program information and the program table to said terminal device in response to a request from said terminal device, said terminal device making a reserve-record setting request for a program in the program table sent from said program-related information providing apparatus, and said terminal device including recording means for recording the requested program on a recording medium and playback means for playing back the program recorded on said recording medium, said program-related information providing apparatus comprising:

search means for searching for the program information stored in said storage means in response to the program-reserve-record setting request sent from said terminal device;

first program-reserve-record setting script generation means for generating a first program-reserve-record setting script, which serves as a control command for recording the program in the program table on said recording medium, based on the program information searched by said search means;

program-related information address display script generation means for generating a program-related information address display script, which serves as a control command to said terminal device, including address information which indicates an address on said network of program-related information of the program in the program table, and also including display time information specifying a display time of the address information;

second program-reserve-record setting script generation means for generating a second program-reserve-record setting script by attaching said program-related information address display script to said first program-reserve-record setting script; and transmission means for transmitting said second program-reserve-record setting script generated by said second program-reserve-record setting script generation means to said terminal device, said terminal device comprising:

first receiving means for receiving said second program-reserve-record setting script transmitted from said transmission means of said program-related information providing apparatus;

detection means for detecting said first program-reserve-record-setting script from said second program-reserve-record setting script received by said first receiving means;

second receiving means for receiving at a predetermined time the program specified by said first program-reserve-record setting script detected by said detection means;

signal conversion means for converting said first program-reserve-record setting script detected by said detection means into a program-reserve-record setting control signal;

control means for controlling said recording means according to the program-reserve-record setting control signal converted by said signal conversion means to record on said recording medium the program received by said second receiving means and said program-related information address display script of said program attached to said second program-reserve-record setting script received by said first receiving means; and display means for displaying the program played back by said playback means, wherein said control means of said terminal device controls said playback means to play back the program recorded on said recording medium in response to a playback request, and reads the address information and the display time information from said program-related information address display script recorded on said recording medium so as to control said display means to display or not to display the read address information based on the display time information.

14. A program-related information providing system according to claim 13, wherein:

said program-related information address display script generation means of said program-related information providing apparatus uses, as the display time information of the program-related information address display script, display start time information specifying a display timing of the address information relative to a program broadcast start time, and display period information specifying a period for which the address information is displayed; and said control means of said terminal device reads the display start time information and the display period information as the display time information, and controls said display means of said terminal device to display the read address information based on the display start time information, and to discontinue displaying the address information based on the display period information.

15. A program-related information providing system according to claim 13, wherein said program-related information providing apparatus comprises billing means for charging a fee to an address information provider which provides the address information to said terminal device.

16. A program-related information providing system according to claim 15, wherein said program-related information address display script generation means of said program-related information providing apparatus generates the program-related information display script so that the address information for which a higher fee has been paid is preferentially displayed on said display means of said terminal device according to the fee charged by said billing means.

17. The program-related information providing system according to claim 13, further comprising;

reception permission means for permitting said terminal device to receive a program in the program table in response to a program viewing request sent from said terminal device.

18. A program-related information providing method for use in a program-related information providing system which comprises a program-related information providing apparatus and a terminal device connected to each other via a network, said program-related information providing apparatus including storage means for storing program information, which serves as attribute information of a program, and a program table, and said program-related information providing apparatus sending the program information and the program table to said terminal device in response to a request from said terminal device, said terminal device making a reserve-record setting request for a program in the program table sent from said program-related information providing apparatus, and said terminal device including recording means for recording the requested program on a recording medium and playback means for playing back the program recorded on said recording medium, said program-related information providing method comprising the steps of:

searching for the program information stored in said storage means by said program-related information providing apparatus in response to the program-reserve-record setting request sent from said terminal device;

generating by said program-related information providing apparatus a first program-reserve-record setting script, which serves as a control command for instructing said recording means to record the program in the program table on said recording medium, based on the searched program information;

generating by said program-related information providing apparatus a program-related information address display script, which serves as a control command to said terminal device, including address information indicating an address on said network of program-related information of the program in the program table, and also including display time information specifying a display time of the address information;

generating a second program-reserve-record setting script by said program-related information providing apparatus by attaching said program-related information address display script to said first program-reserve-record setting script;

transmitting said second program-reserve-record setting script from said program-related information providing apparatus to said terminal device;

receiving by said terminal device said second program-reserve-record setting script transmitted from said program-related information providing apparatus;

detecting by said terminal device said first program-reserve-record-setting script from the received second program-reserve-record setting script;

receiving at a predetermined time by said terminal device the program specified by the detected first program-reserve-record setting script;

converting the detected first program-reserve-record setting script into a program-reserve-record setting control signal by said terminal device;

controlling said recording means by said terminal device according to the converted program-reserve-record setting control signal to record on said recording medium the received program and said program-related information address display script of said program attached to said second program-reserve-record setting script; and controlling by said terminal device said playback means to play back the program recorded on said recording medium in response to a playback request, and reading the address information and the display time information from said program-related information address display script recorded on said recording medium so as to control display means of said terminal device to display or not to display the read address information based on the display time information.

19. A program-related information providing method according to claim 18, wherein:

said program-related information providing apparatus uses, as the display time information of the program-related information address display script, display start time information specifying a display timing of the address information relative to a program broadcast start time, and display period information specifying a period for which the address information is displayed; and said terminal device reads the display start time information and the display period information as the display time information, and controls said display means of said terminal device to display the read address information based on the display start time information, and to discontinue displaying the address information based on the display period information.

20. A program-related information providing method according to claim 18, wherein said program-related information providing apparatus charges a fee to an address information provider which provides the address information to said terminal device.

21. A program-related information providing method according to claim 20, wherein said program-related information providing apparatus generates the program-related information address display script so that the address information for which a higher fee has been paid is preferentially displayed on said terminal device according to the charged fee.

22. The program-related information providing method according to claim 18, further comprising;

permitting said terminal device to receive a program in the program table in response to a program viewing request sent from said terminal device.

23. A program-related information providing system comprising a program-related information providing apparatus, a first terminal device, and a second terminal device connected to each other via a network, said program-related information providing apparatus including storage means for storing program information, which serves as attribute information of a program, and a program table, and said program-related information providing apparatus sending the program information and the program table to said first terminal device in response to a request from said first terminal device, said first terminal device making a reserve-record setting request for a program in the program table sent from said program-related information providing apparatus, and said second terminal device including recording means for recording the requested program on a recording medium and playback means for playing back the program recorded on said recording medium, said program-related information providing apparatus comprising:

search means for searching for the program information stored in said storage means in response to the program-reserve-record setting request sent from said first terminal device;

first program-reserve-record setting script generation means for generating a first program-reserve-record setting script, which serves as a control command for recording the program in the program table on said recording medium based on the program information searched by said search means;

program-related information address display script generation means - for generating a program-related information address display script, which serves as a control command to said second terminal, including address information which indicates an address on said network of program-related information of the program in the program table, and also including display time information specifying a display time of the address information;

second program-reserve-record setting script generation means for generating a second program-reserve-record setting script by attaching said program-related information address display script to said first program-reserve-record setting script; and transmission means for transmitting said second program-reserve-record setting script generated by said second program-reserve-record setting script generation means to said second terminal device, said second terminal device comprising:

first receiving means for receiving said second program-reserve-record setting script transmitted from said transmission means of said program-related information providing apparatus;

detection means for detecting said first program-reserve-record-setting script from said second program-reserve-record setting script received by said first receiving means;

second receiving means for receiving at a predetermined time the program specified by said first program-reserve-record setting script detected by said detection means;

signal conversion means for converting said first program-reserve-record setting script detected by said detection means into a program-reserve-record setting control signal;

control means for controlling said recording means according to the program-reserve-record setting control signal converted by said signal conversion means to record on said recording medium the program received by said second receiving means and said program-related information address display script of said program attached to said second program-reserve-record setting script received by said first receiving means; and display means for displaying the program played back by said playback means, wherein said control means of said second terminal device controls said playback means to play back the program recorded on said recording medium in response to a playback request, and controls said display means to display or not to display the address information included in said program-related information address display script recorded on said recording medium based on the display time information.

24. A program-related information providing system according to claim 23, wherein:

said program-related information address display script generation means of said program-related information providing apparatus uses, as the display time information of the program-related information address display script, display start time information specifying a display timing of the address information relative to a program broadcast start time, and display period information specifying a period for which the address information is displayed; and said control means of said second terminal device reads the display start time information and the display period information as the display time information, and controls said display means of said second terminal device to display the read address information based on the display start time information, and to discontinue displaying the address information based on the display period information.

25. A program-related information providing system according to claim 17, wherein said program-related information providing apparatus comprises billing means for charging a fee to an address information provider which provides the address information to said second terminal device.

26. A program-related information providing system according to claim 25, wherein said program-related information address display script generation means of said program-related information providing apparatus generates the program-related information display script so that the address information for which a higher fee has been paid is preferentially displayed on said display means of said second terminal device according to the fee charged by said billing means.

27. The program-related information providing system according to claim 23, further comprising:

reception permission means for permitting said terminal device to receive a program in the program table in response to a program viewing request sent from said terminal device.

28. A program-related information providing method for use in a program-related information providing system which comprises a program-related information providing apparatus, a first terminal device, and a second terminal device connected to each other via a network, said program-related information providing apparatus including storage means for storing program information, which serves as attribute information of a program, and a program table, and said program-related information providing apparatus sending the program information and the program table to said first terminal device in response to a request from said first terminal device, said first terminal device making a reserve-record setting request for a program in the program table sent from said program-related information providing apparatus, and said second terminal device including recording means for recording the requested program on a recording medium and playback means for playing back the program recorded on said recording medium, said program-related information providing method comprising the steps of:

searching for the program information stored in said storage means by said program-related information providing apparatus in response to the program-reserve-record setting request sent from said first terminal device generating by said program-related information providing apparatus a first program-reserve-record setting script, which serves as a control command for recording the program in the program table on said recording medium based on the searched program information;

generating by said program-related information providing apparatus a program-related information address display script, which serves as a control command to said second terminal device, -including address information indicating an address on said network of program-related information of the program in the program table, and also including display time information specifying a display time of the address information;

generating a second program-reserve-record setting script by said program-related information providing apparatus by attaching said program-related information address display script to said first program-reserve-record setting script;

transmitting said second program-reserve-record setting script from said program-related information providing apparatus to said second terminal device;

receiving by said second terminal device said second program-reserve-record setting script transmitted from said program-related information providing apparatus;

detecting by said second terminal device said first program-reserve-record setting script from the received second program-reserve-record setting script;

receiving at a predetermined time by said second terminal device the program specified by the detected first program-reserve-record setting script;

converting the detected first program-reserve-record selling script into a program-reserve-record setting control signal by said second terminal device;

controlling said recording means by said second terminal device according to the converted program-reserve-record setting control signal to record on said recording medium the received program and said program-related information address display script of said program attached to the received second program-reserve-record setting script; and controlling by said second terminal device said playback means to play back the program recorded on said recording medium in response to a playback request, and controlling display means of said second terminal device to display or not to display the address information included in said program-related information address display script recorded on said recording medium based on the display time information.

29. A program-related information providing method according to claim 28, wherein:
said program-related information providing apparatus uses, as the display time information of the program-related information address display script, display start time information specifying a display timing of the address information relative to a program broadcast start time, and display period information specifying a period for which the address information is displayed; and
said second terminal device reads the display start time information and the display period information as the display time information, and controls said display means of said second terminal device to display the read address information based on the display start jime information, and to discontinue displaying the address information based on the display period information.

30. A program-related information providing method according to claim 28, wherein said program-related information providing apparatus charges a fee to an address information provider which provides the address information to said second terminal device.

31. A program-related information providing method according to claim 30, wherein said program-related information providing apparatus generates the program-related information address display script so that the address information for which a higher fee has been paid is preferentially displayed on said second terminal device according to the fee charged by said billing means.

32. The program-related information providing method according to claim 28, further comprising;
permitting said terminal device to receive a program in the program table in response to a program viewing request sent from said terminal device.

33. A program-related information providing system comprising a program-related information providing apparatus, a terminal device, and a recording/playback device connected to each other via a network, said program-related information providing apparatus including storage means for storing program information, which serves as attribute information of a program, and a program table, and said program-related information providing apparatus sending the program information and the program table to said terminal device in response to a request from said terminal device, said terminal device making a reserve-record setting request for a program in the program table sent from said program-related information providing apparatus, and said recording/playback device including recording means for recording the requested program on a recording medium and playback means for playing back the program recorded on said recording medium,
said program-related information providing apparatus comprising:
search means for searching for the program information stored in said storage means in response to the program-reserve-record setting request sent from said terminal device;
first program-reserve-record setting script generation means for generating a first program-reserve-record setting script, which serves as a control command for instructing said recording/playback device to record the program in the program table on said recording medium based on the program information searched by said search means;
program-related information address display script generation means for generating a program-related information address display script, which serves as a control command to said terminal device, including address information indicating an address on said network of program-related information of the program in the program table, and also including display time information specifying a display time of the address information;
second program-reserve-record setting script generation means for generating a second program-reserve-record setting script by attaching said program-related information address display script to said first program-reserve-record setting script; and
transmission means for transmitting said second program-reserve-record setting script generated by said second program-reserve-record setting script generation means to said terminal device,
said terminal device comprising:
first receiving means for receiving said second program-reserve-record setting script transmitted from said transmission means of said program-related information providing apparatus;
detection means for detecting said first program-reserve-record-setting script from said second program-reserve-record setting script received by said first receiving means;
second receiving means for receiving at a predetermined time the program specified by said first program-reserve-record setting script detected by said detection means;
signal conversion means for converting said first program-reserve-record setting script detected by said detection means into a program-reserve-record setting control signal;
control means for controlling said recording means of said recording/playback device according to the program-reserve-record setting control signal converted by said signal conversion means to record on said recording medium the program received by said second receiving means and said program-related information address display script of said program attached to said second program-reserve-record setting script received by said first receiving means; and
display means for displaying the program played back by said playback means,
wherein said control means of said terminal device controls said playback means of said recording/playback device to play back the program recorded on said recording medium in response to a playback request, and also reads the address information and the display time information from said program-related-information address display script recorded on said recording medium so as to control said display means to display or not to display the read address information based on the display time information.

34. A program-related information providing system according to claim 33, wherein:
said program-related information address display script generation means of said program-related information providing apparatus uses, as the display time information of the program-related information address display script, display start time information specifying a display timing of the address information relative to a program broadcast start time, and display period information specifying a period for which the address information is displayed; and said control means of said terminal device reads the display start time information and the display period information as the display time information, and controls said display means of said terminal device to display the read address information based on the display start time information, and to discontinue displaying the address information based on the display period information.

35. A program-related information providing system according to claim 33, wherein said program-related information providing apparatus comprises billing means for charging a fee to an address information provider which provides the address information to said terminal device.

36. A program-related information providing system according to claim 35, wherein said program-related information address display script generation means of said program-related information providing apparatus generates the program-related information display script so that the address information for which a higher fee has been paid is preferentially displayed on said display means of said terminal device according to the fee charged by said billing means.

37. The program-related information providing system according to claim 33, further comprising;

reception permission means for permitting said terminal device to receive a program in the program table in response to a program viewing request sent from said terminal device.

38. A program-related information providing method for use in a program-related information providing system which comprises a program-related information providing apparatus, a terminal device, and a recording/playback device connected to each other via a network, said program-related information providing apparatus including storage means for storing program information, which serves as attribute information of a program, and a program table, and said program-related information providing apparatus sending the program information and the program table to said terminal device in response to a request from said terminal device, said terminal device making a reserve-record setting request for a program in the program table sent from said program-related information providing apparatus, and said recording/playback device including recording means for recording the requested program on a recording medium and playback means for playing back the program recorded on said recording medium, said program-related information providing method comprising the steps of:

searching for the program information stored in said storage means by said program-related information providing apparatus in response to the program-reserve-record setting request sent from said terminal device;

generating by said program-related information providing apparatus a first program-reserve-record setting script, which serves as a control command for recording the program in the program table on said recording medium, based on the searched program information;

generating by said program-related information providing apparatus a program-related information address display script, which serves as a control command to said terminal device, including address information indicating an address on said network of program-related information of the program in the program table, and also including display time information specifying a display time of the address information;

generating a second program-reserve-record setting script by said program-related information providing apparatus by attaching said program-related information address display script to said first program-reserve-record setting script;

transmitting said second program-reserve-record setting script from said program-related information providing apparatus to said terminal device;

receiving by said terminal device said second program-reserve-record setting script transmitted from said program-related information providing apparatus;

detecting by said terminal device said first program-reserve-record-setting script from the received second program-reserve-record setting script;

receiving at a predetermined time by said terminal device the program specified by the detected first program-reserve-record setting script;

converting the detected first program-reserve-record setting script into a program-reserve-record setting control signal by said terminal device;

controlling said recording means by said terminal device according to the converted program-reserve-record setting control signal to record on said recording medium the received program and said program-related information address display script of said program attached to the received second program-reserve-record setting script; and controlling by said terminal device said playback means of said recording/playback device to play back the program recorded on said recording medium in response to a playback request, and also reading the address information and the display time information from said program-related-information address display script recorded on said recording medium so as to control display means of said terminal device to display or not to display the read address information based on the display time information.

39. A program-related information providing method according to claim 38, wherein:

said program-related information providing apparatus uses, as the display time information of the program-related information address display script, display start time information specifying a display timing of the address information relative to a program broadcast start time, and display period information specifying a period for which the address information is displayed; and said terminal device reads the display start time information and the display period information as the display time information, and controls said display means of said terminaldeviceio-display the read address information based on the display start time information, and to discontinue displaying the address information based on the display period information.

40. A program-related information providing method according to claim 38, wherein said program-related information providing apparatus comprises billing means for charging a fee to an address information provider which provides the address information to said terminal device.

41. A program-related information providing method according to claim 40, wherein said program-related information providing apparatus generates the program-related information address display script so that the address information for which a higher fee has been paid is preferentially displayed on said terminal device according to the fee charged by said billing means.

42. The program-related information providing method according to claim 38, further comprising;
permitting said terminal device to receive a program in the program table in response to a program viewing request sent from said terminal device.

43. A program-related information providing system comprising a program-related information providing apparatus, a first terminal device, a second terminal device, and a recording/playback device connected to each other via a network, said program-related information providing apparatus including storage means for storing program information, which serves as attribute information of a program, and a program table, and said program-related information providing apparatus sending the program information and the program table to said first terminal device in response to a request from said first terminal device, said second terminal device making a reserve-record setting request for a program in the program table sent from said program-related information providing apparatus, and said recording/playback device including recording means for recording the requested program on a recording medium and playback means for playing back the program recorded on said recording medium, said program-related information providing apparatus comprising:
search means for searching for the program information stored in said storage means in response to the program-reserve-record setting request sent from said second terminal device;
first program-reserve-record setting script generation means for generating a first program-reserve-record setting script, which serves as a control command for instructing said recording/playback device to record the program in the program table on said recording medium, based on the program information searched by said search means;
program-related information address display script generation means for generating a program-related information address display script, which serves as a control command to said second terminal device, including address information indicating an address on said network of program-related information of the program in the program table, and also including display time information specifying a display time of the address information;
second program-reserve-record setting script generation means for generating a second program-reserve-record setting script by attaching said program-related information address display script to said first program-reserve-record setting script; and
transmission means for transmitting said second program-reserve-record setting script generated by said second program-reserve-record setting script generation means to said second terminal device, said second terminal device comprising:
first receiving means for receiving said second program-reserve-record setting script transmitted from said transmission means of said program-related information providing apparatus;
detection means for detecting said first program-reserve-record-setting script from said second program-reserve-record setting script received by said first receiving means;
second receiving means for receiving at a predetermined time the program specified by said first program-reserve-record setting script detected by said detection means;
signal conversion means for converting said first program-reserve-record selling script detected by said detection means into a program-reserve-record selling control signal;
control means for controlling said recording means of said recording/playback device according to the program-reserve-record setting control signal converted by said signal conversion means to record on said recording medium the program received by said second receiving means and said program-related information address display script of said program attached to said second program-reserve-record selling script received by said first receiving means; and
display means for displaying the program played back by said playback means,
wherein said control means of said second terminal device controls said playback means of said recording/playback device to play back the program recorded on said recording medium in response to a playback request, and also reads the address information and the display time information from said program-related-information address said recording medium so as to said second terminal device to read address information based display script recorded on control said display means of display or not to display the on the display time information.

44. A program-related information providing system according to claim 43, wherein:
said program-related information address display script generation means of said program-related information providing apparatus uses, as the display time information of the program-related information address display script, display start time information specifying a display timing of the address information relative to a program broadcast start time, and display period information specifying a period for which the address information is displayed; and
said control means of said second terminal device reads the display start time information and the display period information as the display time information, and controls said display means of said second terminal device to display the read address information based on the display start time information, and to discontinue displaying the address information based on the display period information.

45. A program-related information providing system according to claim 43, wherein said program-related information providing apparatus comprises billing means for charging a fee to an address information provider which provides the address information to said second terminal device.

46. A program-related information providing system according to claim 45, wherein said program-related information address display script generation means of said program-related information providing apparatus generates the program-related information display script so that the address information for which a higher fee has been paid is preferentially displayed on said display means of said second terminal device according to the fee charged by said billing means.

47. The program-related information providing system according to claim 43, further comprising;

reception permission means for permitting said terminal device to receive a program in the program table in response to a program viewing request sent from said terminal device.

48. A program-related information providing method for use in a program-related information providing system which comprises a program-related information providing apparatus, a first terminal device, a second terminal device, and a recording/playback device connected to each other via a network, said program-related information providing apparatus including storage means for storing program information, which serves as attribute information of a program, and a program table, and said program-related information providing apparatus sending the program information and the program table to said first terminal device in response to a request from said first terminal device, said second terminal device making a reserve-record setting request for a program in the program table sent from said program-related information providing apparatus, and said recording/playback device including recording means for recording the requested program on a recording medium and playback means for playing back the program recorded on said recording medium, said program-related information providing method comprising the steps of:

searching for the program information stored in said storage means by said program-related information providing apparatus in response to the program-reserve-record setting request sent from said second terminal device; generating by said program-related information providing apparatus a first program-reserve-record setting script, which serves as a control command for recording the program in the program table on said recording medium based on the searched program information;

generating by said program-related information providing apparatus a program-related information address display script, which serves as a control command to said second terminal device, including address information indicating an address on said network of program-related information of the program in the program table, and also including display time information specifying a display time of the address information;

generating a second program-reserve-record setting script by said program-related information providing apparatus by attaching said program-related information address display script to said first program-reserve-record setting script;

transmitting said second program-reserve-record setting script from said program-related information providing apparatus to said second terminal device;

receiving by said second terminal device said second program-reserve-record setting script transmitted from said program-related information providing apparatus;

detecting by said second terminal device said first program-reserve-record-setting script from the received second program-reserve-record setting script;

receiving at a predetermined time by said second terminal device the program specified by the detected first program-reserve-record setting script;

converting the detected first program-reserve-record setting script into a program-reserve-record setting control signal by said second terminal device;

controlling said recording means of said recording/playback device by said second terminal device according to the converted program-reserve-record setting control signal to record on said recording medium the received program and said program-related information address display script of said program attached to the received second program-reserve-record setting script; and controlling by said second terminal device said playback means of said recording/playback device to play back the program recorded on said recording medium in response to a playback request, and also reading the address information and the display time information from said program-related-information address display script recorded on said recording medium so as to control display means of said second terminal device to display or not to display the read address information based on the display time information.

49. A program-related information providing method according to claim 48, wherein:

said program-related information providing apparatus uses, as the display time information of the program-related information address display script, display start time information specifying a display timing of the address information relative to a program broadcast start time, and display period information specifying a period for which the address information is displayed; and said second terminal device reads the display start time information and the display period information as the display time information, and controls said display means of said second terminal device to display the read address information based on the display start time information, and to discontinue displaying the address information based on the display period information.

50. A program-related information providing method according to claim 48, wherein said program-related information providing apparatus comprises billing means for charging a fee to an address information provider which provides the address information to said second terminal device.

51. A program-related information providing method according to claim 50, wherein said program-related information providing apparatus generates the program-related information address display script so that the address information for which a higher fee has been paid is preferentially displayed on said second terminal device according to the fee charged by said billing means.

52. The program-related information providing method according to claim 48, further comprising;

permitting said terminal device to receive a program in the program table in response to a program viewing request sent from said terminal device.

* * * * *